United States Patent [19]
Hayashi et al.

[11] Patent Number: 6,152,350
[45] Date of Patent: Nov. 28, 2000

[54] ULTRASONIC WELDING DEVICE AND METHOD, AND A MAGNETIC TAPE CARTRIDGE REEL WELDING DEVICE AND METHOD

[75] Inventors: Yoichi Hayashi; Shinji Watanabe, both of Kanagawa, Japan

[73] Assignee: Fuji Photo Film Co., Ltd., Kanagawa, Japan

[21] Appl. No.: 09/099,624

[22] Filed: Jun. 18, 1998

[30] Foreign Application Priority Data

| Jun. 19, 1997 | [JP] | Japan | 9-162774 |
| Jun. 23, 1997 | [JP] | Japan | 9-166148 |
| Jun. 23, 1997 | [JP] | Japan | 9-166149 |
| Jun. 24, 1997 | [JP] | Japan | 9-167407 |
| Jun. 24, 1997 | [JP] | Japan | 9-167408 |

[51] Int. Cl.$^7$ ............. B23K 1/06; B23K 5/20; B23K 20/10; B23K 31/12
[52] U.S. Cl. ............. 228/102; 228/103; 228/110.1
[58] Field of Search .............. 228/110.1, 1.1, 228/102, 4.5, 180.5, 103; 156/73.1, 73.3

[56] References Cited

U.S. PATENT DOCUMENTS

| 4,631,685 | 12/1986 | Peter | 364/476 |
| 4,993,618 | 2/1991 | Toyozawa et al. | 228/102 |
| 5,110,381 | 5/1992 | Heckard et al. | 156/64 |
| 5,115,960 | 5/1992 | Shimizu | 228/110 |
| 5,192,015 | 3/1993 | Ingle et al. | 228/111 |
| 5,435,863 | 7/1995 | Frantz | 156/64 |
| 5,658,408 | 8/1997 | Frantz et al. | 156/64 |
| 5,788,791 | 8/1998 | Grewell | 156/73.1 |
| 5,846,377 | 12/1998 | Frantz et al. | 156/359 |
| 5,884,831 | 3/1999 | Sato et al. | 228/6.2 |

OTHER PUBLICATIONS

In re Aller 105 USPQ 233, Mar. 22, 1955.

*Primary Examiner*—Patrick Ryan
*Assistant Examiner*—Kiley Stoner
*Attorney, Agent, or Firm*—Sughrue, Mion, Zinn, Macpeak & Seas, PLLC

[57] ABSTRACT

It is an object of the invention to provide a method and a device which can manufacture, by ultrasonic welding, a reel for use in a magnetic tape cartridge with an improved yield rate, while not only restricting the deformation of workpieces but also preventing the products from varying in quality. At least one of the amplitude of an oscillator power source 80 and pressure to be applied to workpieces in an ultrasonic welding operation are set high in the early stage of the ultrasonic welding operation and are then switched into lower levels in the middle of the ultrasonic welding operation when the workpieces, that is, upper and lower reels 4 and 5, begin to melt together.

8 Claims, 21 Drawing Sheets

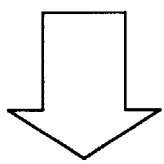
FIG. 4
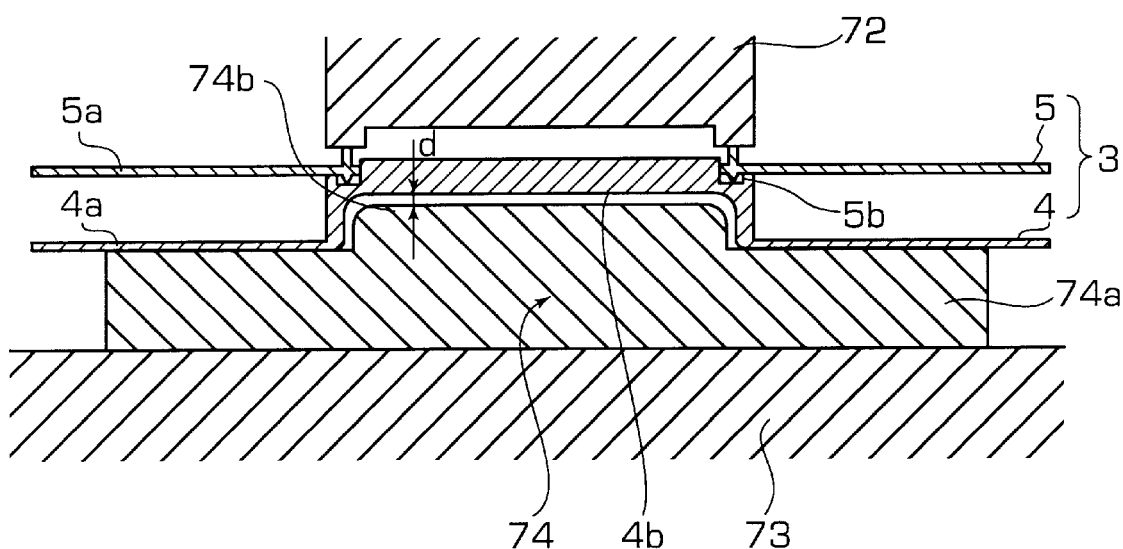

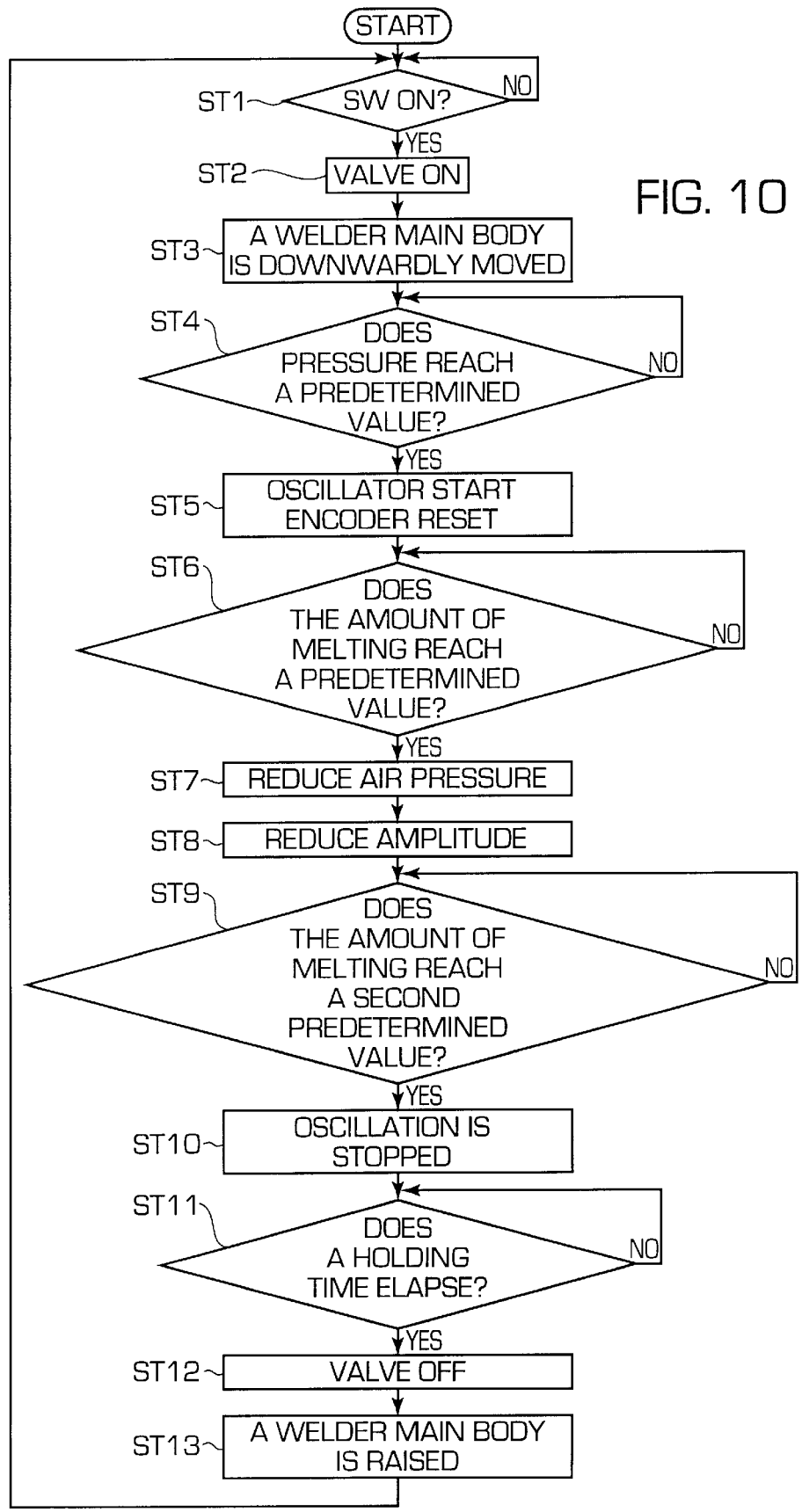

RELATIONSHIP AMONG AMPLITUDE, WELDING TIME, AND SURFACE SLIPPAGE 50N

RELATIONSHIP AMONG AMPLITUDE, WELDING TIME, AND SURFACE SLIPPAGE IN A SECOND STAGE OF TWO-STAGE AMPLITUDE

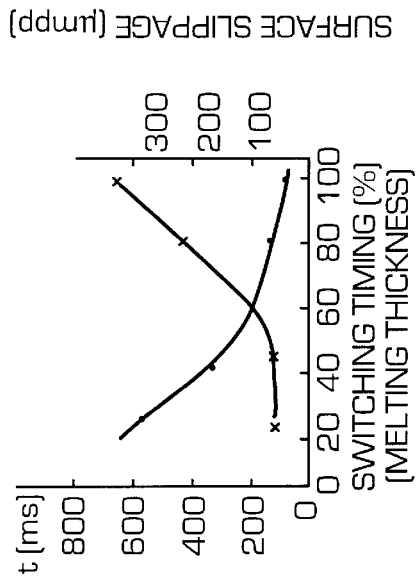
FIG. 12(a) RELATION BETWEEN SECOND-STAGE AMPLITUDE AND OVERSHOOT CHARACTERISTIC
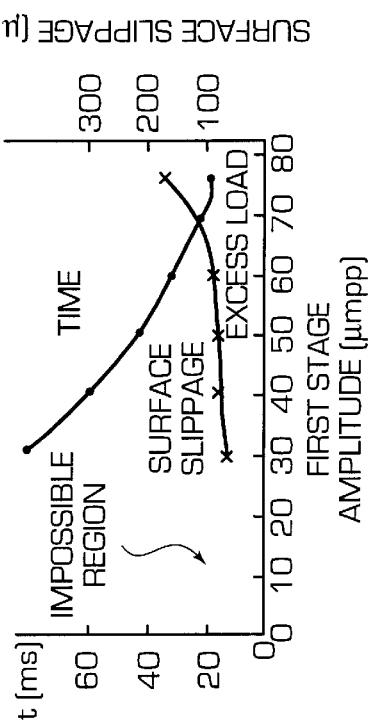
FIG. 12(b) RELATION BETWEEN SECOND-STAGE TIMING WITH RESPECT TO SURFACE SLIPPAGE AND WELDING TIME
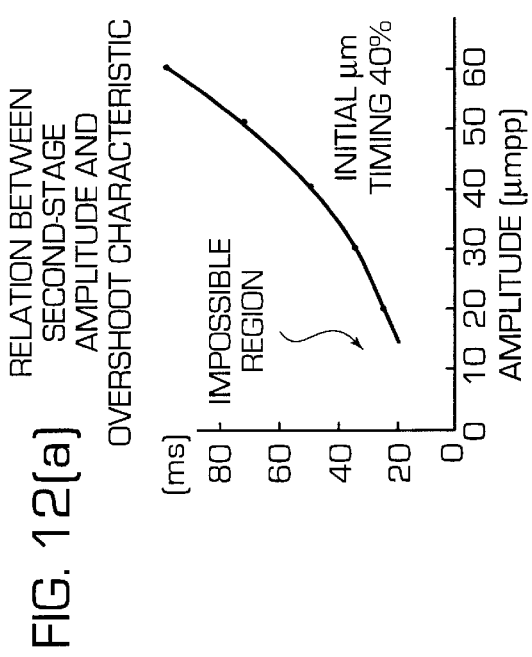
FIG. 12(c) RELATION BETWEEN SURFACE SLIPPAGE AND WELDING TIME WHEN FIRST-STAGE AMPLITUDE IS CHANGED WITH RESPECT TO SECOND-STAGE AMPLITUDE

ULTRASONIC WELDING DEVICE AND METHOD, AND A MAGNETIC TAPE CARTRIDGE REEL WELDING DEVICE AND METHOD

BACKGROUND OF THE INVENTION

The present invention relates to an ultrasonic welding device which, when connecting together plastic moldings by ultrasonic welding, can provide the optimum connecting condition as well as a method for controlling welding in such ultrasonic welding.

Also, the present invention relates to a method and a device for welding together two reels into an integrally connected reel for use in a magnetic tape cartridge. In particular, the present invention relates to a method and a device for welding together upper and lower reels into a reel for use in a magnetic tape cartridge, in which the upper reel includes a reel hub with engagement means for rotation driving disposed on the bottom outer surface thereof, and a flange portion projecting in the radial direction of the upper reel from the lower end outer periphery of the reel hub; and, the lower reel includes a circular opening through which the bottom outer surface of the reel hub having the engagement means can be inserted, and a projecting rib to be welded. That is, the present invention relates to a welding device for welding the lower reel to the periphery of the engagement means of the reel hub of the upper reel.

Conventionally, as a magnetic tape cartridge used as a recording medium in a computer and the like, there is known a structure of a type that a magnetic tape is wound on a single reel. This magnetic tape cartridge is used as the external memory of a computer, while important information is stored in the magnetic tape cartridge. For this reason, the magnetic tape cartridge is structured such that not only it is free from troubles such as tape jamming and the like but also the magnetic tape thereof is prevented from being drawn out unpreparedly.

In FIG. 1, there is shown a conventional magnetic tape cartridge 1 which is used as the magnetic recording medium of a computer such as a tape streamer or the like. As shown in FIG. 1, the conventional magnetic tape cartridge 1 is structured such that a magnetic tape 20 is wound on a single reel 3 composed of an upper reel 4 and a lower reel 5 connected together by ultrasonic welding, while the reel 3 is rotatably stored within a cartridge case which is composed of an upper cartridge 2a and a lower cartridge 2b fastened together by screws 19.

The upper reel 4 is formed of polycarbonate resin with glass fibers contained therein and includes an upper flange 4a in the central portion of which there is formed a recessed portion 4b. Along the outer periphery of the upper flange 4a, there is formed a gear portion 4c.

Also, a ring-shaped bearing 6 is pressure inserted into and fixed to a cylindrical-shaped rib formed in the recessed portion 4b, while a spring plug 7 is pressure inserted into and fixed to a hole formed in the central portion of the bearing 6. And, a reel spring 8 is mounted on the spring plug 7, while the reel spring 8 presses against the reel 3 downwardly and holds the reel 3 in a freely rotatable manner.

On the other hand, the lower reel 5 is formed of polycarbonate resin and includes a lower flange 5a; and, in the periphery of a hole formed in the central portion of the lower flange 5a, there is provided a projecting portion 5b for ultrasonic welding, while the projecting portion 5b is to be ultrasonically welded to the shoulder of the recessed portion 4b of the upper reel 4.

The reel 3, when the cartridge is not in use, is secured by reel brakes 50 and 51, which are respectively energized properly by their associated torsion springs 12 for braking, so that the reel 3 is prevented against an unexpected rotation. Also, when the magnetic tape cartridge 1 is not in use, with the magnetic tape 20 wound completely on the reel 3, leader tape 21 (means which is used by a computer device for introducing the magnetic tape 20 into a tape passage) mounted on the end of the magnetic tape 20 is secured to the leading end portion of a hook 18 which is incorporated into the cartridge near the side face of the cartridge.

And, on the opening portion of the cartridge for pulling out the magnetic tape 20, there is mounted a lid 30 which is properly energized by a torsion spring 15 for lid energization and can be opened and closed in the cartridge plane direction. When the cartridge is not in use, the lid 30 is secured by a lock member 40 which is properly energized by a compression spring 16 so that the lid 30 is prevented against rotation. Also, on the opposite side of the lid 30, there is incorporated a write protect 17.

The leader tape 21, which can be engaged with engagement means for introducing the magnetic tape 20 to the tape passage of a recording and reproducing device, is connected to the magnetic tape 20, for example, by splicing.

In a method for connecting by ultrasonic welding the upper reel 4 and lower reel 5 of the magnetic tape cartridge 1 structured in the above-mentioned manner, as has been described before, the projecting portion 5b, which is provided along the peripheral edge of the opening or hole formed in the central portion of the lower flange 5a of the lower reel 5, is engaged with the shoulder of the peripheral edge of the downwardly projecting end of the recessed portion 4b of the upper reel 4; and, in this engaged state, by applying a given pressure between the projecting portion 5b and recessed portion 4b shoulder to thereby excite them ultrasonically, so that, while melting the projecting portion 5b, the two reels 4 and 5 are connected together.

Also, FIG. 2 shows a welding device for working or welding the above-mentioned reel 3 ultrasonically. An ultrasonic welding device 60 shown in FIG. 2 comprises a working bed 61, a vertical frame 62 erected on one side of the bed 61, an air cylinder 63 suspended from the head portion of the vertical frame 62, a lifting frame 67 which is connected through a pressurization sensor 65 to a plunger 64 projecting into the lower portion of the air cylinder 63 and can be moved along a linear guide 66 disposed inside the vertical frame 62 in such a manner that it can be raised and lowered, an ultrasonic welder unit 68 supported vertically by the lifting frame 67, and a displacement sensor 69 for detecting the motion or displacement of the ultrasonic welder unit 68.

The ultrasonic welder unit 68 is composed of three mutually continuing parts, that is, a converter 70, a booster 71 and a hone 72 to be contacted with a workpiece or a member to be worked, which are arranged sequentially in a descending order from the top of the ultrasonic welder unit 68.

On the other hand, on the upper surface of the bed 61, there is disposed a receive base 74 through a fine adjusting base 73. While one workpiece, that is, the upper reel 4 is fitted with and placed on the receive base 74 and the other workpiece, that is, the lower reel 5 is fitted with the upper surface of the upper reel 4, by lowering the ultrasonic welder unit 68, the two upper and lower reels 4 and 5 are pressurized and excited to thereby produce friction heat between them, so that the mutually connecting surfaces of the upper and lower reels 4 and 5 can be welded together.

The thus structured air cylinder 63 and ultrasonic welder unit 68 are driven and controlled by a control unit 75 which outputs such instructions to the air cylinder 63 and ultrasonic welder unit 68 as correspond to the information that is input therein from the pressurization sensor 65 and displacement sensor 69.

The control unit 75, which is composed of a programmable controller or the like, not only can monitor variations in the respective parts during the reel working or welding operation in accordance with clock frequencies that are counted by a built-in timer, but also includes a display, a key board and the like (which are not shown) so that it is able to set various kinds of working or welding operations by inputting various numerical values.

In particular, the control unit 75 controls the air cylinder 63 in the following manner: that is, when a start switch 76 is turned on, while monitoring the detected condition from the load cell or pressurization sensor 65, the control unit 75 not only adjusts an air pressure supplied from an air cylinder driving air pressure source 77 to a given pressure through a pressure adjusting device 78 but also controls the air by opening or closing an electromagnetic valve 79; that is, when the electromagnetic valve 79 is opened, then the plunger 64 is projected to thereby lower the ultrasonic welder unit 68 down to a working or welding position, or when the electromagnetic valve 79 is closed, then the plunger 64 is retreated to its original position to thereby separate the ultrasonic welder unit 68 from the working or welding position.

Also, the control unit 75 controls the ultrasonic welder unit 68 in the following manner: that is, when the start switch 76 is turned on, while monitoring the detected condition of the linear encoder or displacement sensor 69, the control unit 75 starts an oscillator power source 80 and, at the same time, excites the ultrasonic welder unit 68 with the amplitude that is adjusted and set through an amplitude adjusting device 81.

In the above-mentioned conventional ultrasonic welding method, optimum pressure, amplitude and welding time are set according to the material and thickness of the workpiece, and the workpiece is worked uniformly under such set conditions. However, after the workpiece starts to melt, if the pressure and amplitude thereof are held constant until the working or welding is finished, then it is found that the workpiece is caused to deform.

In fact, for example, in the reel 3, the parallelism deviation between the upper reel 4 and lower reel 5 is worsened, which makes it easy to cause a so called surface slippage between the upper and lower reels 4 and 5, resulting in a high rate of occurrence of defective products.

On the other hand, when the workpiece is worked or welded under the conditions that are lower than the above-mentioned optimum set values, there occurs poor welding which not only causes the yield rate of the material to lower but also, even if the workpieces are the same in the material and thickness, causes the products to vary easily in quality.

And, when the workpieces -are welded together with the low pressure and low amplitude, it takes a longer time to weld them, which in turn lowers the productivity thereof.

Also, in the above-structured ultrasonic welding device 60, as shown in FIG. 3, there is produced a slight gap d between the fitting portion peripheral edge of the receive base 74 to be fitted with the upper reel 4 and the opening of the upper reel 4. That is, this gap causes the receive base 74 and upper reel 4 to play and, in the working or welding operation, there is produced such a vertical slippage as shown by arrows in FIG. 3, which in turn causes the yield rate of the material to lower.

To prevent such play, the gap margin may be set sufficiently small from the beginning. However, in this case, it is troublesome to install the upper reel 4 on the receive base 74 side and, especially, when the upper reel 4 is inserted automatically, such small gap margin provides the cause of wrong insertion. Therefore, it is indispensable to secure a certain degree of gap. That is, they are opposed to each other.

Further, in the above-structured ultrasonic welding device 60, as shown in FIG. 4, since the receive base 74 is structured such that the boss support portion 74b thereof is provided on and projected from the central position of the flange support portion 74a formed integrally therewith, when the upper reel 4 is placed on the upper portion of the boss support portion 74b and the flange portion 4a of the upper reel 4 is seated on the flange portion 74a of the receive base 74, they can be set in such a manner that there is produced a gap d between the top portion of the boss support portion 74b and the inner surface of the boss portion 4b due to the dimensional tolerance thereof or the like.

On the contrary, although not shown, while the inner surface of the boss portion 4b is set on the top portion of the boss support portion 74b in a close contact manner, the flange portion 4a can be set in such a manner that it is not seated on the flange support portion 74a but is separated therefrom.

Therefore, in the former case, after the lower reel 5 is mounted onto the upper reel 4 to thereby complete their setting, if the ultrasonic welder unit is lowered, then the upper and/or lower reels can be pushed by an amount corresponding to the gap d due to the collision inertia thereof, pressing forces applied in the working or welding operation, and the like, so that they can be deformed, which in turn causes the yield rate of the material to lower.

Also, in the latter case, due to the gap between the side surface of the boss support portion 74b and the inner wall surface of the boss portion 4b, the reel 4 can be vibrated while it is worked or welded, which, similarly to the above case, causes the yield rate of the material to lower.

The above-mentioned magnetic tape cartridge is structured such that, as shown in FIG. 1, the magnetic tape 20 is wound on the single reel 3 composed of the upper reel 4 and lower reel 5 connected together by ultrasonic welding, while the reel 3 is rotatably stored within the cartridge case 2 which is composed of the upper cartridge 2a and lower cartridge 2b fastened together by the screws 19 or the like.

The upper reel 4 of the above-mentioned single reel 3, as shown in FIGS. 5 and 6 as well, is composed of a reel hub 42 and a flange portion 43 which are united together into an integral body by means of synthetic resin: in particular, the reel hub 42 is formed in a bottomed cylindrical shape, and includes in the bottom portion outer surface thereof a plurality of securing teeth 42a serving as engagement means for rotation driving, and also includes a cylindrical portion 42b on the outer periphery of which the magnetic tape 20 can be wound; and, the flange portion 43 projects in the radial direction of the reel 4 from the outer periphery of the upper end of the reel hub 42, and includes in the outer peripheral edge thereof a plurality of restricting gears 43a with which the reel locks 50, 51 can be engaged when restricting the rotation of the reel 4 while the magnetic tape cartridge is not in use. As shown in FIG. 2, the bottomed recessed portion formed in the reel hub 42 is opened upwardly (in FIGS. 5 and 6, downwardly).

The lower reel 5 is formed in a disk shape which includes in the central portion thereof a circular opening 5d for insertion of the above-mentioned securing teeth 42a therethrough and, on the periphery of the opening 5d, there is projectingly provided a welding rib 5c which can be butted against a welding contact portion (stepped surface) 42c annularly formed in the periphery of the securing teeth 42a. And, as shown in FIG. 6, while the welding rib 5c is assembled on the bottom portion of the reel hub 42 of the upper reel 4, the lower reel 5 can be welded ultrasonically to the upper reel 4 by an ultrasonic welding device (which will be discussed later).

When the above-mentioned magnetic tape cartridge 1 is set in its corresponding external memory device or the like, then rotation driving means provided on the external memory device side is engaged with the securing teeth 42a of the reel 3 projecting into an opening 2c formed in the central portion of the lower cartridge 2b, and, at the same time, the lid 30 is opened by a tape pull-out mechanism provided on the external memory device side and thus the leader tape 21 is pulled into a given position in a tape running path, thereby allowing the data to be written into or read out from the magnetic tape 20.

The above-mentioned reel 3 for a magnetic tape cartridge must have a high dimensional accuracy in order for the magnetic tape 20 to be able to run stably with high accuracy and, for this reason, the operation to connect the upper reel 4 and lower reel 5 to each other by welding must be carried out carefully.

Now, FIG. 7 shows a conventional welding device 160 which is used to weld together the above-mentioned upper reel 4 and lower reel 5.

The conventional welding device 160 comprises a welding receive base 161 for supporting the upper reel 4 in the reversed state in which the flange portion 43 is disposed in the lower portion thereof, so that the welding receive base 161 can support the upper reel 4 from the bottom portion inner surface side of the reel hub 42, and a welding horn 162 which, with the lower reel 5 assembled to the bottom portion of the reel hub 42 of the upper reel 4, presses the annular rib 5b of the lower reel 5 against the upper reel 4.

And, as shown in FIG. 8, if, while the lower reel is pressed and energized properly by the welding horn 81, ultrasonic vibrations are given to the welding horn 81, then there are generated ultrasonic vibrations Y in the reel thickness direction. Due to the thus generated ultrasonic vibrations Y, as shown in FIG. 9, the welding rib 5c is melted and the thus melted resin of the welding rib 5c is then hardened, with the result that the upper and lower reels 4 and 5 can be welded together.

Also, as the welding receive base 161, there is used either a receive base 164 structured such that it supports the upper reel 4 by means of a flange contact portion 163 thereof which can be contacted with the surface of the flange portion 43 of the upper reel 4, or a receive base 165 structured such that it supports the upper reel 4 by means of the upper end face 166 of a center projecting portion which can be fitted with the bottomed recessed portion of the reel hub 42, while the flange contact portion 163 and upper end face 166 are both formed in a flat surface.

And, the flange contact portion 162a of the welding horn 162, which can be contacted with the annular rib 5b in order to apply the ultrasonic vibration energy to the welding rib 5c, is also formed in a flat surface.

However, in the above-mentioned conventional welding device 160, due to the ultrasonic vibrations applied from the welding horn 162, the upper reel 4 can be made to slip off in position in the radial direction thereof with respect to the welding receive base 161 or can be made to rotate with respect to the lower reel 5; that is, the upper reel 4 is not stabilized. This causes the upper and lower reels 4 and 5 to be welded unevenly, which in turn results in the lowered welding accuracy, the slippage of the surface of the lower reel, and other similar problems.

In view of this, in order to prevent the positional slippage and relative rotation of the upper reel 4 when the ultrasonic vibrations are applied thereto, the present inventors have studied the employment of a structure in which the welding receive base 161 is so arranged as to be fittable with the bottomed recessed portion of the reel hub 42 like the receive base 165 shown in FIG. 7, and the dimensional tolerance is reduced (for, example, down to 0.07 mm or less, preferably, down to 0.05 mm or less) so that the receive base 165 and reel hub 42 can be closely fitted with each other. However, when the dimensional tolerance is reduced in this manner, it takes time and labor to mount the reel hub 42 onto the receive base 165 and remove the former from the latter, which makes it impossible to enhance the productivity.

In particular, in connecting the upper reel 4 and lower reel 5 to each other by ultrasonic welding, the center projecting portion of the receive base 165 is fitted and inserted into the bottomed recessed portion of the reel hub 42. If the dimensional tolerance is small, then not only the positioning accuracy of the upper reel 4 with respect to the receive base 165 must be enhanced but also it is difficult to exhaust the air within the bottomed recessed portion of the reel hub 42. That is, if the center projecting portion of the receive base 165 is quickly inserted into the bottomed recessed portion of the reel hub 42, then there is generated an insertion resistance between them. And, also when the integrally welded reel 3 for a magnetic tape cartridge is removed from the receive base 165, there is generated a removing resistance between them, which makes it impossible to take out the reel 3 quickly.

Also, when the upper and lower reels 4 and 5 are welded together in this manner, the ultrasonic vibrations Y applied in the welding operation cause the respective contact portions of the upper and lower reels 4 and 5 (in particular, the respective contact portions of the welding rib 5c and welding contact portion 42c) to rub against each other, resulting in the shaved resin. And, if shaved powder 85 produced due to such shaved resin is left between the upper and lower reels 4 and 5, then there is a possibility that the shaved powder 85 can attach to the magnetic tape wound on the reel 3, thereby raising a possibility that some signals can be missed in the recording and reproducing operation of the magnetic tape cartridge.

Further, if the welding rib 5c melts excessively and is thereby welded excessively so that the melted welding rib 5c overflows into the tape winding area (that is, the outer peripheral area of the reel hub 42), as shown in FIG. 9, the lump 91 of melted and hardened resin 90 causes damage to the magnetic tape that is to be wound on the outer periphery of the reel hub.

SUMMARY OF THE INVENTION

The present invention is made based on the above-mentioned circumstances of the prior art. Accordingly, it is an object of the invention to provide a welding control method for use in an ultrasonic welding operation in which workpieces can be worked or welded together with a high yield rate and with enhanced productivity while restricting the deformation of the workpieces to thereby prevent the welded workpieces or products from varying in quality.

In attaining the above object, according to the invention, there is provided a welding control method for use in an ultrasonic welding operation in which a horn is contacted with and pressed against a workpiece to thereby melt and weld the workpiece, wherein the amplitude of the horn is switched into a lower level in the middle of melting of the workpiece than the level thereof set at the start time of the ultrasonic welding operation of the workpiece.

According to the above-mentioned invention, it is possible to prevent the occurrence of poor welding caused by the excessive melting of the workpiece.

In the above-mentioned method according to the present invention, the amplitude may be preferably switched into the lower level before at least one half of the workpiece thickness to be melted until the workpiece is welded completely is melted.

According to this condition, it is possible to prevent poor melting caused by a delay in an actual response to the amplitude switching time.

In addition, in the above-mentioned method of the present invention, preferably, an apparatus operable to carry out the above-mentioned method may comprise amplitude switching means for switching the amplitude of an oscillator power source in two stages, that is, into a beginning amplitude and a later amplitude, detecting means for detecting the melted condition of the workpiece with the passage of the welding thereof, and switching control means which, in accordance with the detection results of the detecting means, drives the switching means to switch the amplitude of the oscillator power source from the beginning amplitude to the later amplitude.

According to the present invention, the two-stage amplitude control can be executed automatically according to the conditions that have been previously set.

Also, in attaining the above object, according to the invention, there is provided a welding control method for use in an ultrasonic welding operation in which the pressure to be applied to a workpiece in an ultrasonic welding operation is switched in the middle of melting of the workpiece into a lower level than the level thereof set at the start time of the welding operation of the workpiece.

According to the above-mentioned method, it is possible to prevent the occurrence of poor welding caused by the excessive melting of the workpiece.

In the above-mentioned method according to the present invention, the amplitude may be preferably switched at a timing before at least one half of the workpiece thickness to be melted until the workpiece is welded completely is melted.

According to this condition, it is possible to prevent poor melting or the like caused by a delay in an actual response to the amplitude switching time.

Further, in the above-mentioned method of the present invention, preferably, an apparatus operable to carry out the above-mentioned method may comprise pressure switching means for switching the pressure of a pressure drive source into a plurality of stages, detecting means for detecting the melted condition of the workpiece with the passage of the welding thereof, and switching control means which, in accordance with the detection results of the detecting means, drives the switching means to execute the above-mentioned switching operation.

According to the present invention, the pressure control can be carried out automatically.

In the present invention, both of the amplitude of the oscillator power source and the pressure to be applied to the workpiece may also be switched in such a manner that they are set large in the starting time of the welding operation of the workpiece and are switched into their respective lower levels in the middle of the welding operation of the workpiece.

According to the present structure, since both of the amplitude and pressure can be controlled, the welding operation of the workpiece can be executed with higher accuracy.

Also, the present invention aims at eliminating the problems found in the above-mentioned conventional ultrasonic welding devices. Accordingly, it is an object of the invention to provide an ultrasonic welding device which not only can facilitate the installation of a workpiece but also, in the working or welding condition thereof, can bring the workpiece into close contact with a receive base to thereby restrict the occurrence of the slippage of the workpiece with respect to the receive base.

Furthermore, in achieving the above object, according to the invention, there is provided an ultrasonic welding device comprising: an ultrasonic welder unit which can be raised up to and lowered down to and from a working or welding position and is also composed of a converter, a booster and a horn; and, a receive base which is disposed at the working or welding position and opposed to the horn and is used to hold a workpiece in the leading end portion thereof in such a manner that the workpiece is fitted with the leading end portion thereof, wherein the leading end portion of the receive base can be expanded and compressed in the radial direction thereof.

Therefore, according to the invention, when the workpiece is attached to the receive base, the leading end of the receive base can be compressed in the radial direction thereof to thereby prevent the wrong insertion of the workpiece, and, while the workpiece is being attached/inserted therein, the leading end of the receive base can be expanded in the radial direction thereof to thereby be able to minimize a gap between them.

Further, the present invention aims at solving the above-mentioned problems. Accordingly, it is an object of the invention to provide an ultrasonic welding device in which, in the ultrasonic welding operation thereof, the boss portion and flange portion of a workpiece can be closely contacted with the top portion of a boss support portion and a flange support portion respectively formed in a receive base disposed in the ultrasonic welding device, thereby being able to restrict the deformation of the workpiece which could be caused when pressure is applied to the workpiece.

In accomplishing the above object, according to the invention, there is provided an ultrasonic welding device which comprises an ultrasonic welder unit raisable to and lowerable down from a working or welding position and including a converter, a booster and a horn, and a receive base disposed at the working or welding position and opposed to the horn for holding a workpiece in the leading end portion thereof in such a manner that the workpiece is fitted with the leading end portion thereof, wherein the receive base includes a flange support base for supporting the flange portion of the workpiece, and boss support portion projectingly provided in the central portion of the flange support base and fittable with the boss portion of the workpiece; the boss support portion of the receive base is disposed in such a manner that it can be lifted to and lowered down from the flange support base; and, there is provided energizing means for energizing the boss support portion in the lifting direction thereof.

Therefore, according to the present invention, if the welder unit is lowered, then the boss support portion of the receive base holding the workpiece is lowered down together with the workpiece against the energizing force of the energizing means, and, if the flange portion of the workpiece is seated on the flange support portion of the receive base, then the workpiece can be worked or welded while it is held in this position.

Thus, the present invention aims at eliminating the drawbacks found in the above-mentioned conventional ultrasonic welding device. Accordingly, it is an object of the invention to provide a magnetic tape cartridge reel welding device which not only allow a reel to be mounted onto and removed from a welding receive base simply and quickly to thereby be able to enhance the productivity thereof, but also, when the reel is welded ultrasonically, prevents the upper reel of the reel from slipping off in position with respect to the welding receive base and from rotating with respect to the lower reel of the reel, thereby being able to prevent the upper and lower reels from being welded together unevenly, so that a high-accuracy reel for a magnetic tape cartridge can be produced.

Still furthermore, in attaining the above object, according to the invention, there is provided a magnetic tape cartridge reel welding device which comprises: a welding receive base for supporting an upper reel from the bottom portion inner surface side of the reel hub of the upper reel, the upper reel being composed of the reel hub and a flange portion formed integrally with each other, the reel hub having a bottomed cylindrical shape and including engaging means for rotation driving on the outer surface of the bottom portion thereof, with a magnetic tape windable around the outer periphery of the cylindrical portion thereof, and the flange portion projecting in the radial direction of the reel hub from the outer periphery of the upper end of the reel hub; and, a welding horn for pressing a lower reel, which includes in the central portion thereof a circular opening for allowing the engaging means to be inserted therethrough, against the upper reel in such a manner that the lower reel is contacted with a welding contact portion formed in the periphery of the engaging means and is thereby assembled to the bottom portion of the reel hub, whereby ultrasonic vibration energy is applied from the welding horn to the portions of the upper and lower reels to be welded to thereby weld together the upper and lower reels into an integral body, characterized in that the welding receive base includes reel hub fixing means capable of applying a draw-in force or a blow-out force with respect to the reel hub mounted on the welding receive base.

According to the above structure, when the upper reel is set or mounted onto the welding receive base, by operating the reel hub fixing means to apply the draw-in force to the upper reel, the mounting of the upper reel can be attained more quickly. Also, in the ultrasonic welding operation, since the reel hub fixing means applies the draw-in force to the upper reel, the upper reel can be positively held and fixed onto the welding receive base, which prevents the upper reel from slipping off in position in the radial direction thereof with respect to the welding receive base or rotating with respect to the lower reel due to vibrations transmitted thereto from the welding horn. Further, when removing the upper reel from the welding receive base, the removal of the upper reel can be achieved more quickly.

Moreover, the present invention aims at solving the problems found in the above-mentioned conventional ultrasonic welding method and device. Accordingly, it is an object of the invention to provide method and device for manufacturing by ultrasonic welding a reel for use in a magnetic tape cartridge, which not only can remove effectively the shaved powder of shaved resin produced when upper and lower reels are connected together by ultrasonic welding, but also can prevent the melted resin from overflowing into a tape winding area in the welded portions of the reels.

In achieving the above object, according to the invention, there is provided a magnetic tape cartridge reel welding method, in which an upper reel, which is composed of not only a reel hub having a bottomed cylindrical shape and including engaging means for rotation driving on the outer surface of the bottom portion thereof with a magnetic tape windable around the outer periphery of the cylindrical portion thereof but also a flange portion so formed as to project in the radial direction of the reel hub from the outer periphery of the upper end of the reel hub, is ultrasonically welded to a lower reel including a circular opening into which the bottom portion outer surface including the engaging portion can be inserted, thereby connecting the upper and lower reels into an integral body, characterized in that, in such a manner that the lower reel is contacted with a welding contact portion formed in the periphery of the engaging means and is thereby assembled to the bottom portion of the reel hub, the upper and lower reels are welded together ultrasonically while applying a negative pressure to the inner peripheral portion of the opening of the lower reel.

Also, in attaining the above object, according to the invention, there is provided a magnetic tape cartridge reel welding device which comprises: a welding receive base for supporting an upper reel from the inner surface side of the bottom portion of a reel hub of the upper reel, the upper reel being composed of not only the reel hub having a bottomed cylindrical shape and including engaging means for rotation driving on the outer surface of the bottom portion thereof with a magnetic tape windable around the outer periphery of the cylindrical portion thereof but also a flange portion so formed as to project in the radial direction of the reel hub from the outer periphery of the upper end of the reel hub; and, a welding horn for pressing a lower reel, which includes in the central portion thereof a circular opening for allowing the engaging means to be inserted therethrough, against the upper reel in such a manner that the lower reel is contacted with a welding contact portion formed in the periphery of the engaging means and is thereby assembled to the bottom portion of the reel hub, whereby ultrasonic vibration energy is applied from the welding horn to the portions of the upper and lower reels to be welded to thereby weld together the upper and lower reels into an integral body, characterized in that the welding horn includes draw-in means for applying a negative pressure to the inner peripheral portion of the opening formed in the lower reel.

BRIEF DESCRIPTION OF THE DRAWINGS

FIG. 4 is an enlarged view of another conventional receive base employed in the conventional ultrasonic welding device;

FIG. 10 is a flow chart of a working procedure, according to the present invention, to be taken in the ultrasonic welding device shown in FIG. 2;

FIG. 12(a) is a graphical representation of the relation between the second-stage amplitude variations and overshoot characteristics, FIG. 12(b) a graphical representation of the relation between surface slippage and welding time with respect to the timing of the second-stage amplitude, and FIG. 12(c) is a graphical representation of the relation between surface slippage and welding time when the first-stage amplitude is caused to vary;

DETAILED DESCRIPTION OF THE PREFERRED EMBODIMENTS

Figure 1:
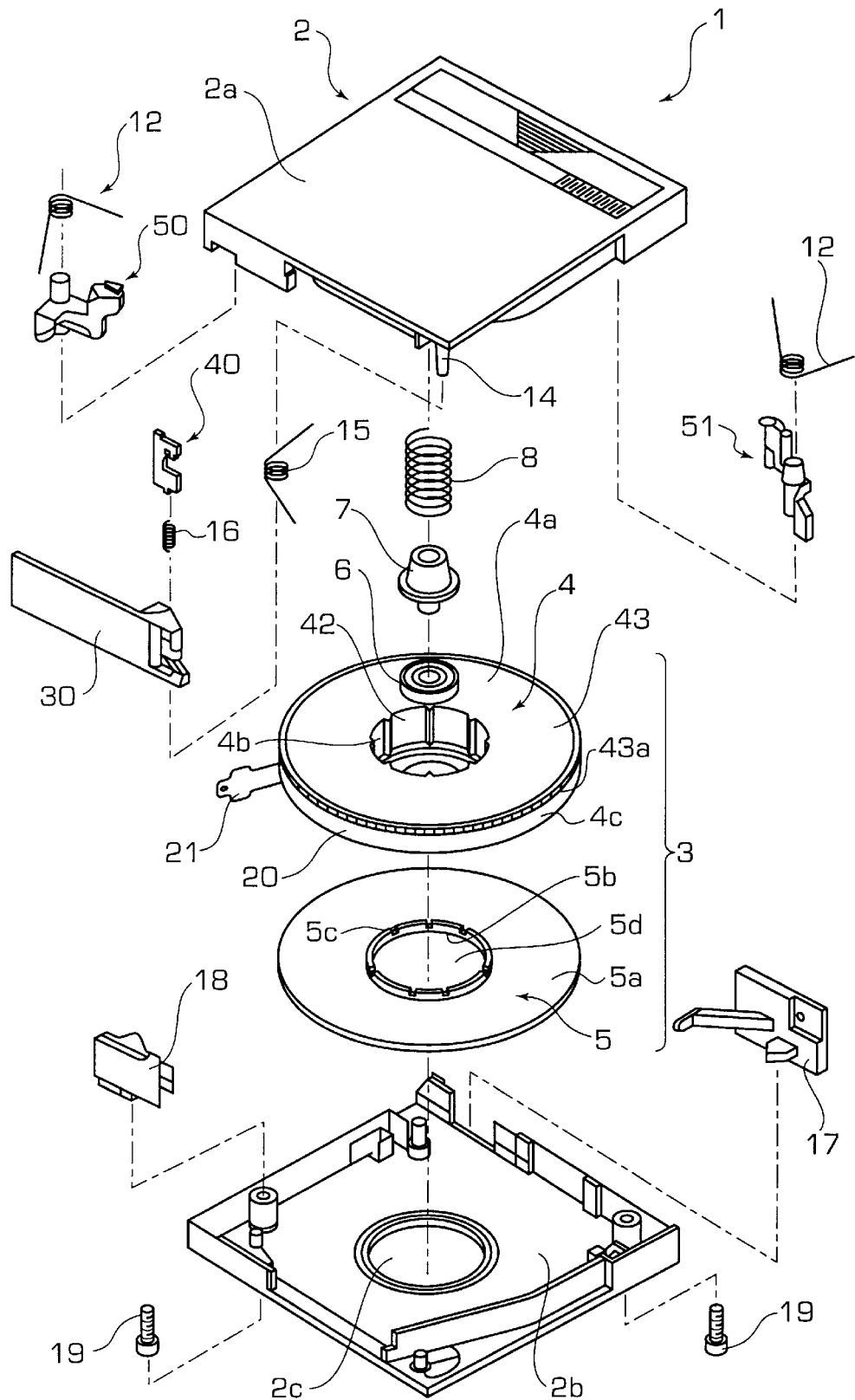
FIG. 1 is an exploded perspective view of a conventional magnetic tape cartridge using a single reel.
Figure 2:
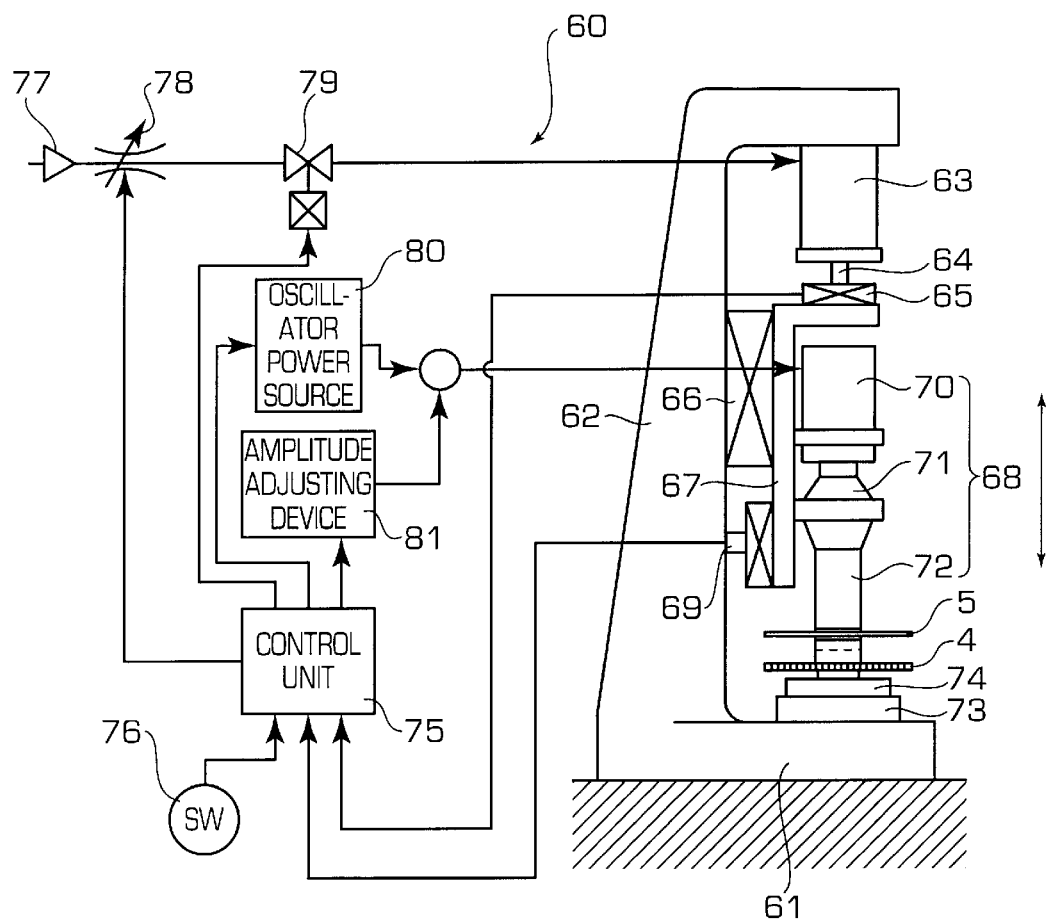
FIG. 2 is a general view of a conventional ultrasonic welding device.
Figure 3:
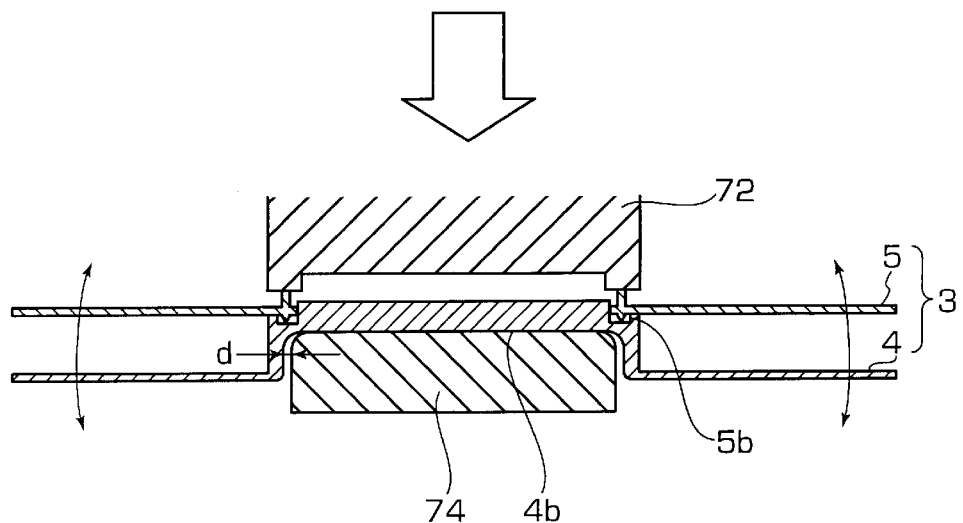
FIG. 3 is an enlarged view of a conventional receive base employed in the conventional ultrasonic welding device.

Now, description will be given below in detail of the preferred embodiments according to the invention with reference to the accompanying drawings.

In the above-mentioned conventional ultrasonic welding method, the control of the control unit 75 of the welder main body or unit 68 is executed constantly until the ultrasonic welding operation is completed. On the contrary, in a welding method according to the invention, a control unit 75, as shown in FIG. 10, executes its control in two stages.

In particular, FIG. 10 shows a control procedure when pressure and amplitude are both varied in two stages, that is, a working or welding beginning stage and a later stage. If a start switch 76 is turned on, then the control unit 75 turns on a solenoid valve 79 and, in response to this, a plunger 64 is projected from a cylinder 63 to thereby lower down a welder main body or unit 68.

As a result of this, if a load to be detected by a load cell or pressure sensor 65 reaches an initially set value, then an oscillator power source 80 is started and, at the same time, a linear encoder 69 serving as a displacement sensor is reset to an initial value 0 (Steps ST1 to ST5).

By the way, in the above-mentioned respective steps, the pressure and amplitude are both held at the initially set values.

Next, the workpieces are welded together to thereby lower the welder main body or unit down from the initial position, and the amount of melting of the workpieces (that is, the downward displacement of the welder main body or unit) is detected by the linear encoder 69. And, if the melting amount or the downward displacement reaches a set value which has been previously input through a keyboard or the like, then the control unit 75 transmits set value switching signals respectively to a pressure adjusting device 78 and an amplitude adjusting device 81, so that both of the pressure and amplitude are reset by the pressure adjusting device 78 and amplitude adjusting device 81 into their respective second set values which are lower than the initially set values (Steps ST6 to ST8).

In this state, if the linear encoder 69 detects that the welding amount reaches or exceeds the second set values, then the oscillation is stopped and the workpieces are respectively held in this state only by the pressure; and, from this state, if a timer issues a time-up signal, then the solenoid valve 79 is turned off, the welder main body 68 moves upward, and both of the pressure and amplitude are reset to their respective initial values, when the working or welding of the workpieces is caused to stop: that is, the control unit 75 waits again for the turn-on of the start switch 76 in Step ST1 (Steps ST9 to ST13).

By the way, the two-stage switching timing of the amplitude in the above-mentioned steps ST6 to ST8, preferably, may be executed before the melting thickness reaches one half of the final melting thickness and, more preferably, it may be executed in the range of 20 to 40% of the final melting thickness.

The reasons for this are as follows: although the melting time using ultrasonic waves varies according to the material and thickness of the workpieces to be welded, in the case of the size of a recording medium such as the above-mentioned reel 3, the actual working time is short, in particular, 100 to 50 ms and, therefore, even if the amplitude is reduced, the switching time is not be able to follow this immediately due to the relationship to the heat capacity; and, the mechanical system can be slow in response.

By the way, besides the above-mentioned control method using the detected values detected by the encoder 69, there is available a control method based on time. However, the control based on time is not desirable, because the melting time varies by 20% or more due to variations in the shape of the portions of the workpieces to be melted and/or according to the ambient temperatures, and amplitude variations (variations due to the temperature of a converter and the like).

Also, in the above-mentioned embodiment, there is shown a case in which not only the amplitude but also the pressure are caused to vary from the large values to the small values. However, it is also possible to employ a multi-stage control method: that is, if the initial pressure is held small, next, in Step ST5, it is made to vary into a large pressure at the same time when the melting is started, and, next, in Steps ST6 to ST8, the pressure is reduced together with the amplitude variation, then the melting amount can be controlled with more accuracy.

Next, description will be given below of an embodiment in which, as workpieces, the lower reel 5 is ultrasonically welded to the above-mentioned upper reel 4. However, the invention is not limited to this embodiment.

Out of the workpieces that are employed in the present embodiment, the lower reel 5, as mentioned above, is formed of polycarbonate and is structured such that it has a diameter of 93.2 mm, a central hole diameter 37.5 mm, a general portion thickness of 1.27 mm, and a projecting portion 5b height of 0.3 mm.

Also, the upper reel 4 is formed of glass fiber reinforced polycarbonate and includes a recessed portion. In operation, the central hole of the lower reel 5 is fitted with the shoulder portion of a projecting end portion provided in the lower portion of the recessed portion of the upper reel 4 and, at the same time, the present shoulder portion is contacted with the projecting portion 5b of the lower reel 5; and, in particular, if the projecting portion 5b is butted against the contact surface of the shoulder portion and they are melted together until they are perfectly flattened, then the two workpieces can be connected into an integral body.

Various tests have been conducted on the above-mentioned two workpieces in two cases: that is, in one case, their respective amplitudes are caused to vary in two stages; and, in the other, their respective pressures are caused to vary.

[Amplitude Two-stage Control]

Figure 11A:
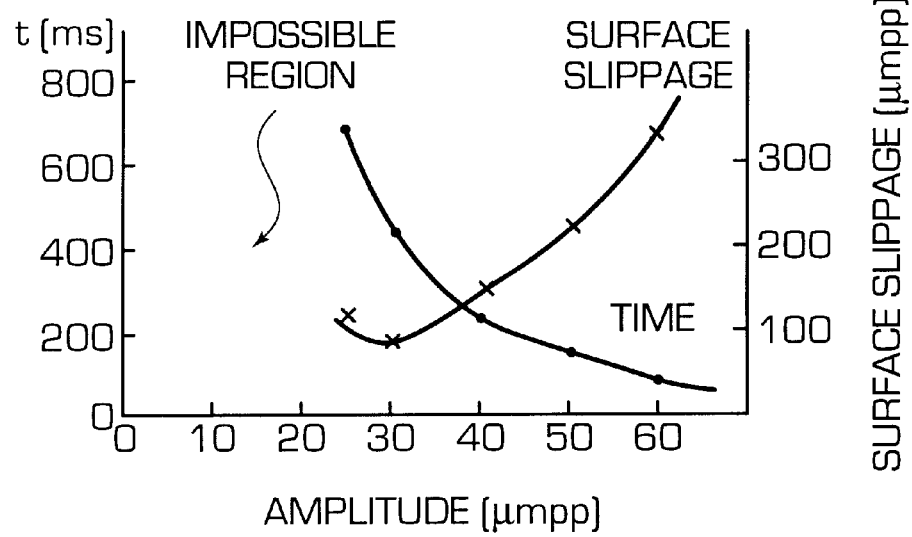
FIG. 11(a) is a graphical representation of the relation of the amplitude variations with respect to the working time and surface slippage in the conventional welding method in which the amplitude is-set constant through the welding operation; and, FIG. 11(b) is a graphical representation of the relation of the second-stage amplitude variations with respect to the working time and surface slippage in a welding method according to the invention employing a two-stage amplitude switching system.

Now, FIGS. 11(a) and (b) respectively show the relation between the welding time and amplitude when the pressure of each working operation is set constant as 50 N, as well as the relation of them with respect to the surface slippage of the reel 3 caused thereby. In particular, FIG. 11(a) shows the results obtained by the conventional method in which the amplitude is set constant from the beginning of the working to the end thereof, and FIG. 11(b) shows the results obtained by a method according to the invention in which the amplitude is set as 60 $\mu$m in the beginning of the working and the amplitude is caused to vary at the timing of 40% of the working time.

That is, FIG. 11(a) shows that, in the conventional control method, the working is impossible when the amplitude is 20 $\mu$m or less and also that, as the amplitude increases, the surface slippage increases excessively.

Figure 11B:
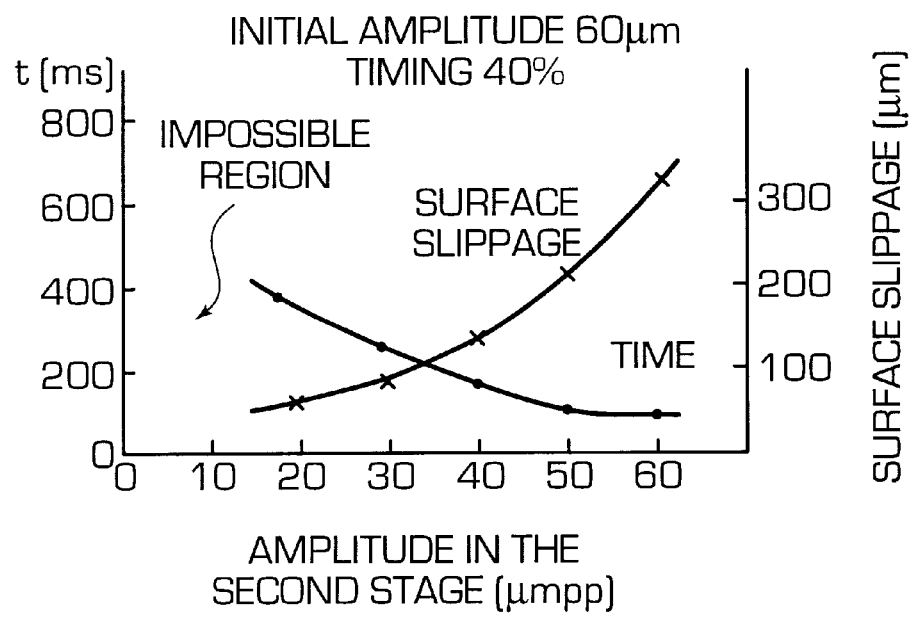

On the other hand, FIG. 11(b) shows that, according to the present invention in which the amplitude is set in two stages, in the second stage amplitude, the unworkable amplitude is 15 $\mu$m or less, that is, the workable amplitude range is larger than in the conventional method, and also that the increasing gradient of the surface slippage with respect to the variations in the amplitude is small.

Next, the above-mentioned workpieces are observed on the welding time and surface slippage when the overshoot characteristics and switching timings are caused to change in the two-stage amplitude control, as well as on the welding time and surface slippage when the first-stage amplitude is caused change. From these observations, there are obtained the results that are shown in FIGS. 12(a) to (c).

Figure 13:
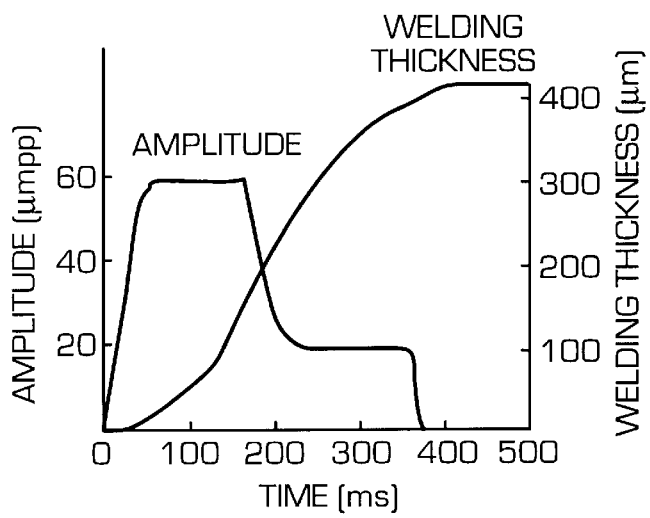
FIG. 13 is a graphical representation of the relation of the amplitude variations with respect to the melting time and working time.

That is, these results show that the optimum characteristic when the melting margins of the workpieces are set for 400 $\mu$m, the melting time is set in the range of 400 ms~500 ms and the pressure is fixed to 50 N, as shown in FIG. 13, can be obtained at the time when the initial amplitude is in the range of 40~50 $\mu$mpp, the later amplitude is 20 $\mu$mpp, and the switching timing melting thickness is in the range of 100~150 $\mu$m.

Further, Table 1 shows the comparison results of the working or welding conditions of the present embodiment of the invention with the conventional method when the melting margins of the workpieces are set for 400 $\mu$m, the melting time is set in the range of 400 ms~500 ms and the pressure is fixed to 50 N: in particular, in the present embodiment, the observation results are obtained at the time when the initial amplitude reaches 60 $\mu$mpp, the later amplitude reaches 40 $\mu$mpp, and the switching timing melting thickness reaches 150 $\mu$m, whereas, in the conventional method, the amplitude is set constant throughout the melting time.

TABLE 1

|  | Initial amplitude [μmpp] | Later amplitude [μmpp] | Variations in thickness 3σ[μm] | Surface slippage 3σ[μm] |
| --- | --- | --- | --- | --- |
| Conventional Method | 40 | 40 | 12 | 134 |
| Conventional Method | 20 | 20 | Poor Welding | — |
| Conventional Method | 60 | 60 | 25 | 183 |
| Present Invention | 40 | 20 | 7 | 92 |
| Present Invention | 40 | 20 | 9 | 123 |

From the results shown in Table 1, it can be confirmed that, the variations in thickness and surface slippage are both large in the conventional method using a constant amplitude, whereas the variations in thickness is effectively reduced according to the present invention. By the way, in the present invention as well, when the initial amplitude is 60 μmpp, then the surface slippage is large although it is not so large as in the conventional method. Therefore, it is also confirmed that, if the initial amplitude is set in the range of 30~50 μmpp, then the most desirable results can be obtained.

[Pressure Multi-Stage Control]

Figure 14A:
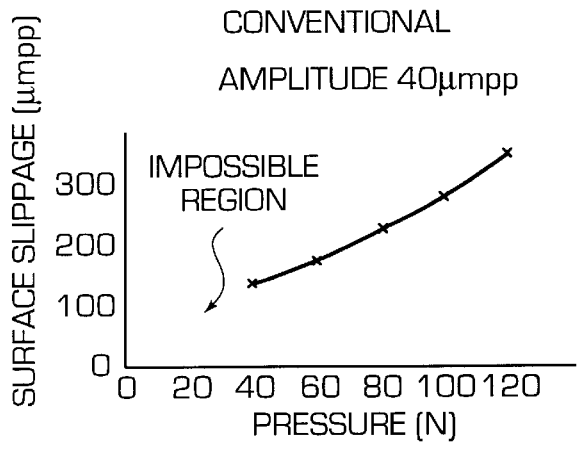
FIG. 14(a) is a graphical representation of the relation of the pressure variations with respect to the surface slippage when a constant pressure is applied in the conventional welding method.
Figure 14B:
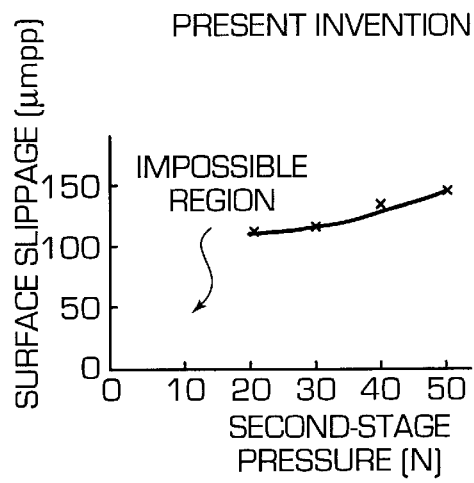
FIG. 14(b) is a graphical representation of the relation between the second-stage pressure and surface slippage in a welding method according to the invention employing a two-stage pressure switching system.

Now, FIGS. 14(a) and (b) respectively show the relation between the pressure and surface slippage obtained when the amplitude of each working operation is set constantly as 40 μmpp: In particular, FIG. 14(a) shows a conventional method in which the pressure is set constant from the start of the working to the end thereof, whereas FIG. 14(b) shows the present invention in which the initial working pressure is set as 50 N and the pressure is caused to change at the timing of 40% of the working time.

From FIG. 14(a), it is found that, in the conventional method, the surface slippage increases substantially in proportion to the increase of the pressure.

On the other hand, when the two-stage pressure system is employed according to the invention, these figures show that the rate of increase of the surface slippage is less than half of the increase rate of the conventional method.

Figure 15:
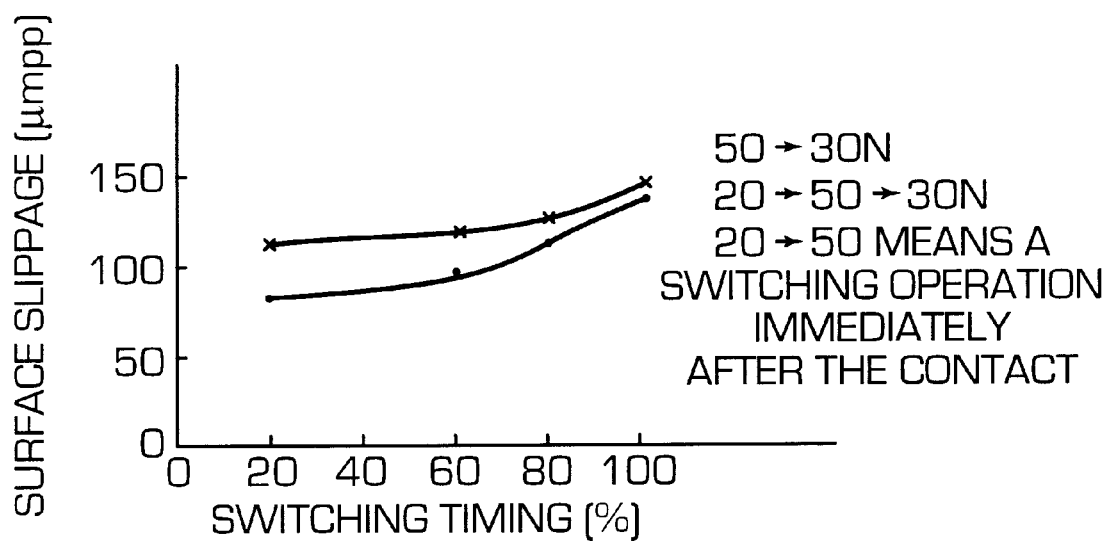
FIG. 15 is a graphical representation of the relation between switching timings and surface slippage.

Next, when observing the relation between the pressure switching timing and surface slippage, there are obtained the characteristics that are shown in FIG. 15.

By the way, in FIG. 15, the switching of the pressure from 20 N to 50 N is a switching executed just after the horn is contacted with the workpieces. That is, before the horn is contacted with the workpieces, the pressure is set small, the small pressure is switched into a large pressure just after contact, and next the large pressure is switched into a small pressure.

From this characteristic view, it is confirmed that the three-stage switching is effective in reducing the surface slippage of the workpieces.

Figure 16:
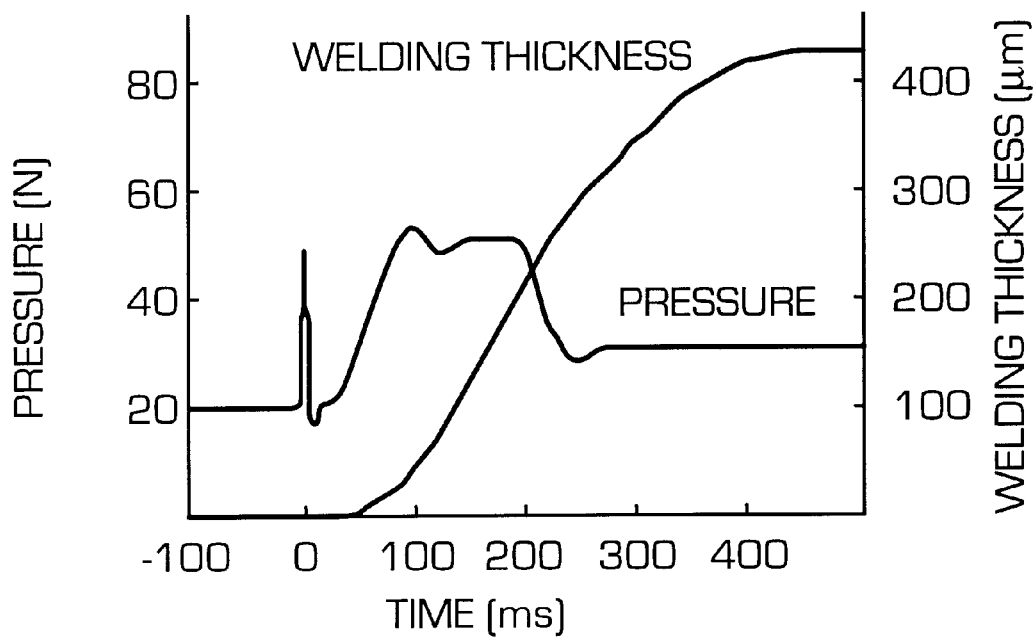
FIG. 16 is a graphical representation of the relation of the pressure variations with respect to the melting time and working time.

In view of the above results, as shown in FIG. 16, it is confirmed that, if the pressure is switched into 50 N just after the contact of the horn with the workpieces and the pressure 50 N is caused to vary to a pressure 30 N when the melting thickness is on the order of 150 μm, then a proper pressure characteristic can be obtained.

Further, Table 2 shows the comparison results of the working conditions of the present embodiment of the invention with the conventional method when the melting margins of the workpieces are set for 400 μm, the melting time is set in the range of 400 ms~500 ms and the amplitude is fixed to 40 μmpp: in particular, in the present invention, the pressure is caused to vary at the time when the switching timing melting thickness reaches 150 μm, whereas, in the conventional method, the pressure is set constant throughout the melting time.

TABLE 2

|  | Early Pressure [N] | Later Pressure [N] | Variations in thickness 3σ[μm] | Surface slippage 3σ[μm] |
| --- | --- | --- | --- | --- |
| Conventional Method | 50 | 50 | 12 | 134 |
| Conventional Method | 30 | 30 | 8 | 107* |
| Present Invention | 50 | 30 | 9 | 113 |
| Present Invention | 20 → 50 | 30 | 7 | 85 |

*Melting time must be extended.

From the results shown in Table 2, it can be confirmed that, the variations in thickness and surface slippage are both large in the conventional method using a constant amplitude, whereas the variations in thickness is effectively reduced according to the present invention using a two-stage amplitude.

As can be clearly seen from the foregoing description, with use of a welding control method in an ultrasonic welding operation according to the invention, when compared with the conventional method in which welding or working is carried out with both of pressure and amplitude set constant, not only poor welding due to excessive melting can be prevented but also the productivity can be enhanced.

Now, description will be given below in detail of a second embodiment according to the invention with reference to the accompanying drawings. By the way, in the present embodiment, since other portions thereof than the main portions thereof are the same as or equivalent to those employed in the above-mentioned conventional method or device, they are given the same designations and thus only the different members thereof will be described below using different reference characters.

Figure 17:
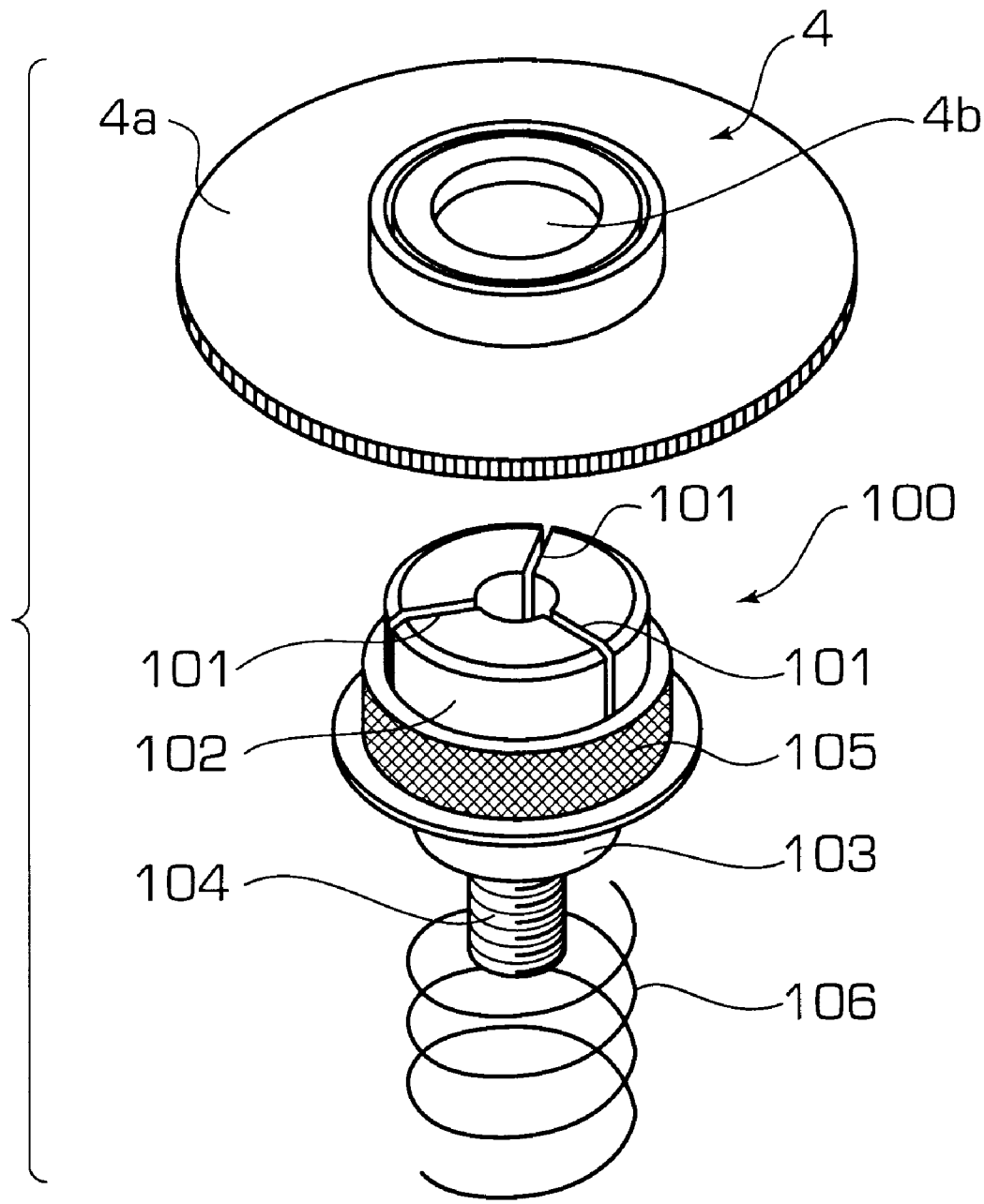
FIG. 17 is an exploded perspective view of a receive base employed in a second embodiment according to the invention.

Here, FIGS. 17 and 18 respectively show the main portions of a receive base employed in the second embodiment of the invention.

In FIGS. 17 and 18, in a receive base 100, there are formed by cutting three collet grooves 101 which respectively extend in the radial direction of the receive base 100 from the center thereof and divide the periphery of the receive base 100 into three parts. The receive base 100 includes a receive portion 102 fittable with the opening of the recessed portion 4b of the upper reel 4 used as a workpiece, a tapered cone portion 103 which is formed integrally with the lower portion of the receive portion 102 with a stepped portion between them and also has a diameter gradually decreasing toward the lower side thereof, a mounting portion 104 formed integrally with the lower portion of the tapered cone portion 103, a flanged collet sleeve 105 fitted movably with the outer periphery of the tapered cone portion 103, and a compression coil spring 106 for radius reducing which is disposed on the outer periphery of the tapered cone portion 103 a collet and is inserted between the collet sleeve 105 and the fine adjusting base 73.

And, with the respective parts of the receive base 100 assembled together, as shown in FIG. 18, if the mounting portion 104 is screwed into and fixed to a base seat 107, then the receive base 100 can be fixed onto the base seat 107.

The respective collet grooves 101, when they are free, are given spring elasticity in the width spreading direction thereof, thereby increasing the radius of the receive portion 102. However, the radius spreading of the receive portion 102 is restricted by the inside diameter of the collet sleeve 105, so that the receive portion 102 is held in the reduced radius state.

Therefore, in the assembled state of the receive base 100, the collet sleeve 105 is always energized to its raised position and is thereby pushed up to the stepped position. The present push-up of the collet sleeve 10 reduces the widths of the respective collet grooves 101 of the receive portion 102 to thereby reduce the radius of the receive portion 102 uniformly toward the central side thereof.

Figure 18A:
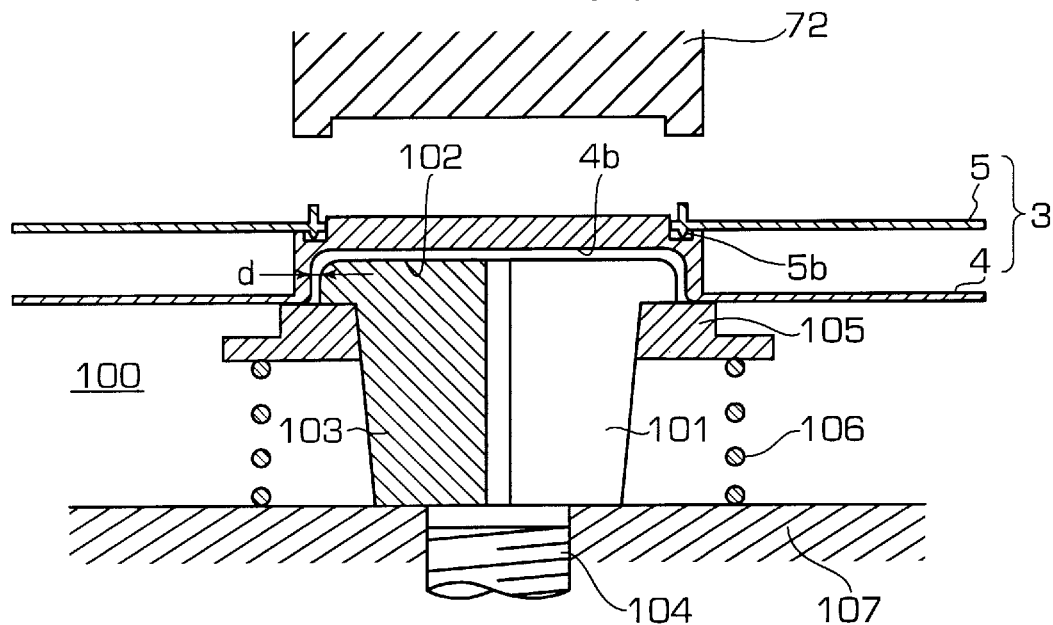
FIG. 18(a) is an enlarged view of the main portions of the second embodiment, showing a state thereof in which upper and lower reels are mounted on the above receive base; and, FIG. 18(b) is an enlarged view of the main portions of the second embodiment, showing a state thereof, following the above state, in which a horn is pressed against the upper and lower reels mounted on the receive base.

In particular, FIG. 18(a) shows a state in which the horn 72 of the welder unit 68 is held at its raised position and is thus separated from the workpiece; that is, since the collet sleeve 105 is held at the raised position due to the spring pressure, the collect sleeve 105 reduces the radius of the receive portion 102 to thereby secure a sufficient gap d between the receive portion 102 and the upper reel 4 to be mounted on the receive portion 102, which makes it possible to insert the upper reel 4 into the receive base 100 positively.

Figure 18B:
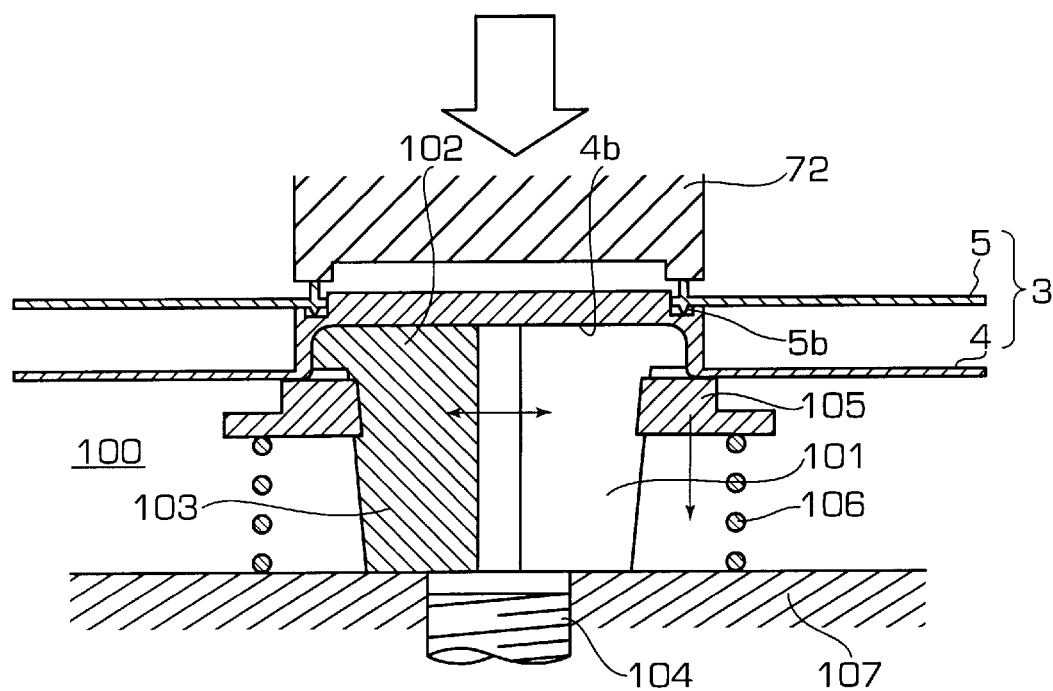

The lower reel 5 is placed on the upper reel 4 to thereby set the receive base 100 into a working wait state and, next, from this working wait state, as shown in FIG. 18(b), if the welder unit 68 is lowered and thus the horn 72 is contacted with the lower reel 5 to thereby push down the lower reel 5, then the collet sleeve 105 is pushed down against the spring pressure of the compression coil spring 106, with the result that the radius of the receive portion 102 is increased to thereby be able to minimize the gap between the opening of the upper reel 4 and itself.

Therefore, in this state, even if the welder unit 68 is excited, no surface slippage can be produced in the upper reel 4 with respect to the receive base 100, which makes it possible to prevent the lowered yield rate of the products possibly caused by such surface slippage.

Also, in addition to the above surface slippage preventive effect, the initial collision inertia of the welder unit 68 is relieved by a damping effect provided by the compression spring 106, which makes it possible to eliminate an inconvenience caused by such initial collision inertia.

By the way, if the minimized gap margin when the inner periphery of the opening of the upper reel 4 is held by the outer periphery of the receive portion 102 is too large, then it causes the surface of the upper to slip off the receive base 100 as in the conventional method. Therefore, the gap margin must be set properly with the resin material forming the upper reel 4, the thickness of such material and the like taken into consideration. For example, in the case of the above-mentioned magnetic cartridge tape size, the gap margin may be preferably of 0.07 mm or less, more preferably, 0.05 mm or less, and most preferably, 0.02 mm or less. However, when the radius of the receive portion 102 is set in such a manner that the outer periphery of the receive portion 102 can be pressed against the inner periphery of the opening of the upper reel 4, it causes the resin of the upper reel 4 to deform; that is, the gap margin may be set so that it can provide a minimum value depending on the working precision of the receive base 100.

Figure 19:
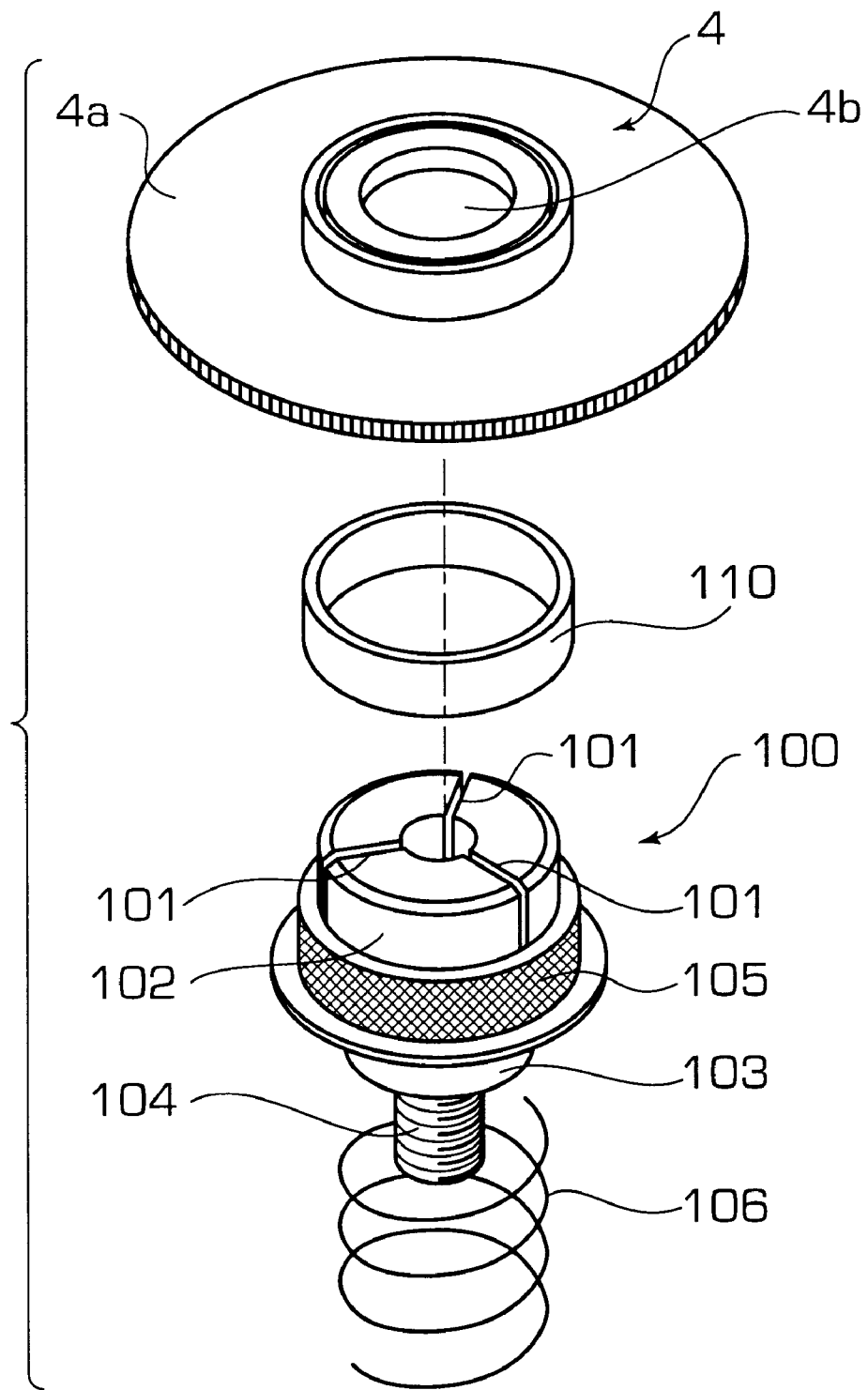
FIG. 19 is an exploded perspective view of a receive base employed in a third embodiment according to the invention.

Now, FIG. 19 shows the main portions of a third embodiment of an ultrasonic welding device according to the invention. In FIG. 19, the third embodiment is similar to the previously described first embodiment except that the outer periphery of the receive portion 102 is covered with a rubber tube 110. In the present embodiment, direct contact between metal and resin is avoided to thereby prevent damage and deformation which could be caused due to the direct contact.

By the way, in the above-mentioned respective embodiments, there is employed a mechanism in which the receive portion 102 can be spread and compressed by the collet sleeve 105 and compression spring 106. However, even if the collet grooves 101 are simply formed, when the lower reel 5 is inserted, the receive portion 102 can be reduced in radius to receive the lower reel 5 in spite of possible slight displacement of the insertion position. That is, the above-mentioned mechanism is not always indispensable.

Also, the number of the collet grooves 101 is not limited to three, but the number of the collet grooves 101 may be two or more. And, the more the number of the collet grooves 101 is, the more accurately the circularity deviation of the receive portion 102 can be set.

As can be understood clearly from the foregoing description, in an ultrasonic welding device according to the third embodiment of the invention, when the workpiece is inserted into the receive base, the receive portion of the receive base can be reduced in radius to thereby prevent the wrong insertion of the workpiece and, in the workpiece inserted state, the receive portion can be increased in radius to thereby minimize the gap between them. This not only allows the ultrasonic welding operation to be executed with high accuracy but also can prevent the yield rate of the material from lowering due to the surface slippage of the workpiece with respect to the receive base.

Now, FIG. 20 shows the main portions of a fourth embodiment of an ultrasonic welding device according to the invention. In FIG. 20, a receive base 200 comprises a flange support base 201 which is fixedly disposed on an adjusting base 73, a boss support portion 203 which is disposed in the central position of the flange support base 201 in such a manner that it can be raised and lowered through a guide hole 202 so formed in the central position of the flange support base 201 as to extend in the vertical direction thereof, and a compression coil spring 204 which is interposed between the bottom surface of the boss support portion 203 and the adjusting base 73 and is used as energizing means for energizing the boss support portion 203 in the rising direction thereof.

By the way, as means for fixing the fixing portion of the flange support base 201, the peripheral lower portion thereof may be fixed to the adjusting base 73 or one side portion thereof may be horizontally fixed to the vertical frame 62.

Figure 20A:
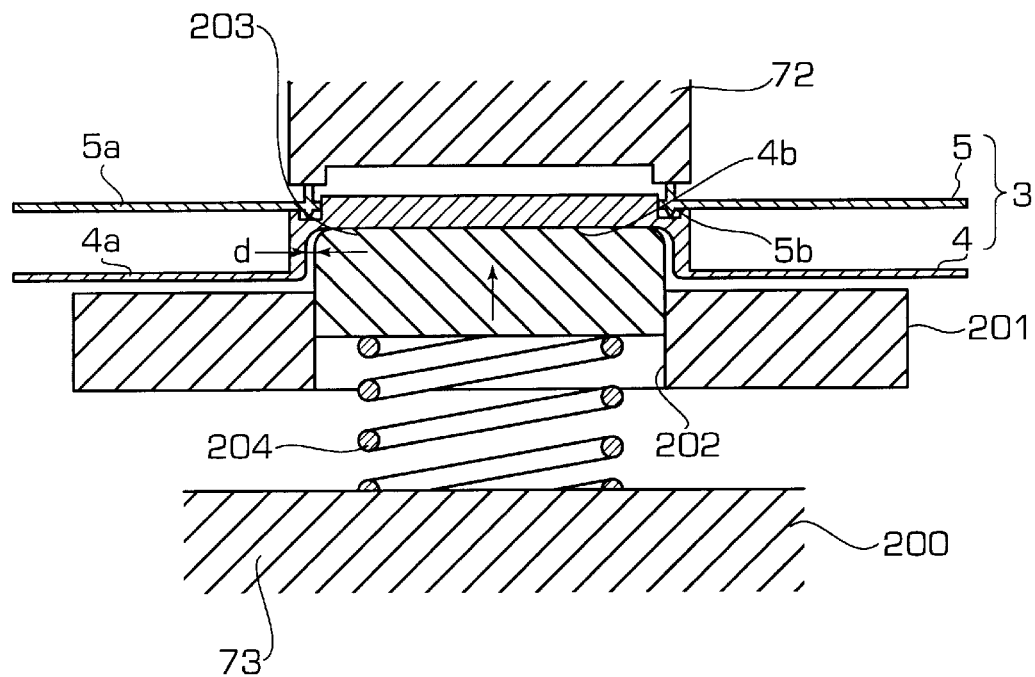
FIG. 20(a) is an enlarged view of the main portions of a fourth embodiment according to the invention, showing a state thereof in which upper and lower reels are mounted on a receive base.

In the above-mentioned structure, as shown in FIG. 20(a), when the welder unit 68 is situated at the working wait position, if the boss portion 4b of the upper reel 4 is inserted into the boss support portion 203 of the receive base 200 and the projecting portion 5b of the lower reel 5 is mounted into the groove formed in the peripheral edge of the upper portion of the boss portion 4b, then the welder unit 68 is put into a working preparation state.

In the working preparation state, the boss support portion 203 is situated at the raised position due to the spring pressure, and the inner surface of the boss portion 4b of the upper reel 4 is in close contact with the top portion of the boss support portion 203. On the other hand, the flange portion 4a of the upper reel 4 is floating above the flange support base 201.

Figure 20B:
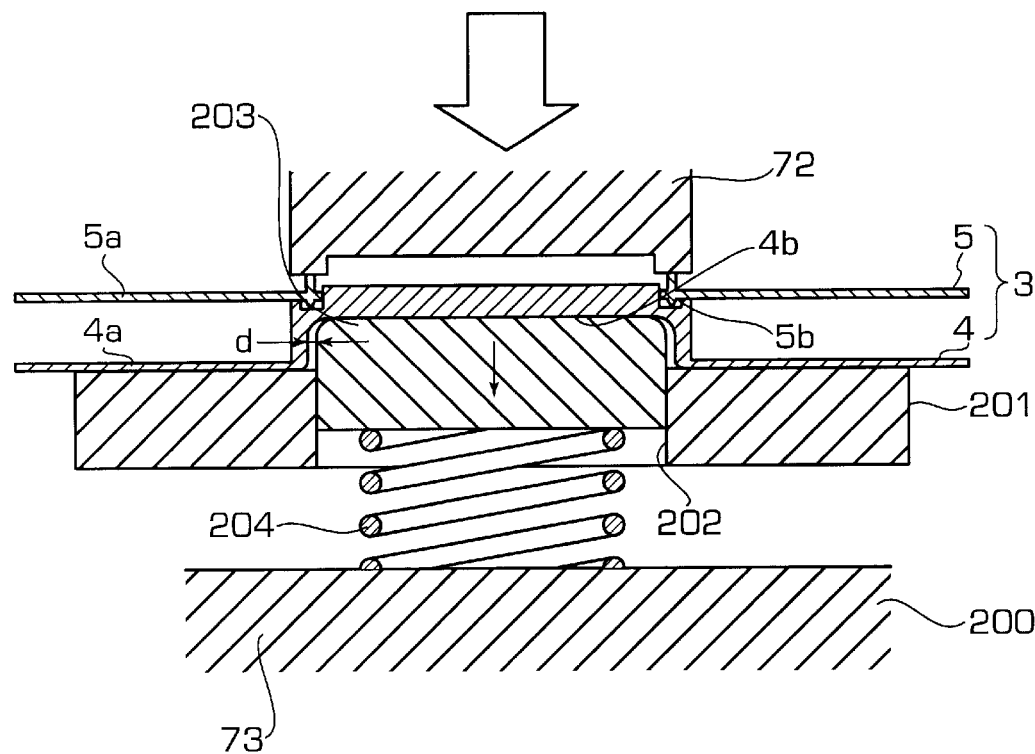
FIG. 20(b) is an enlarged view of the main portions of the fourth embodiment, showing a state thereof in which a horn is pressed against the upper and lower reels mounted on the receive base from the above state.

From this state, if the switch 76 is turned on, then the welder unit 68 is lowered down and thus, if the horn 72 disposed on the leading end of the welder unit 68 is contacted with and pressed against the lower reel 5, then the initial collision inertia thereof and the pressure applied in the working operation following this, as shown in FIG. 20(b), cooperate together in pushing down the boss support portion 203 together with the upper and lower reels 4 and 5, with the result that the flange portion 4a of the upper reel 4 can be seated on the flange support base 201 and the lowering motion thereof is stopped at this seated position.

In this state, working or welding is executed by means of ultrasonic excitation: in particular, the boss support portion 203 is worked while it is kept in close contact with the inner surface of the boss portion 4b due to the spring force applied in opposition to the pressure of the ultrasonic excitation, thereby preventing the deformation of the reel boss portion as well as the surface slippage of the upper reel with respect to the receive base.

By the way, the total pressure to be applied to the workpieces, that is, the upper and lower reels 4 and 5, in the case of the above-mentioned magnetic cartridge tape size, may be preferably in the range of 10~100 N, more preferably, in the range of 20~60 N. On the other hand, the spring pressure to be applied in opposition to the above total pressure may be set preferably in the range of 20~80% of the total pressure, more preferably, in the range of 30~60% thereof.

If the spring pressure is lower than the above-mentioned range, then the boss support portion 203 is caused to resonate by the ultrasonic excitation and is thereby vibrated, with the result that the working is unstabilized; and, on the contrary, if the spring pressure is higher than the range, then not only the holding pressure applied to the workpieces, that is, the upper and lower reels 4 and 5 increases undesirably but also the damping effect in the initial collision decreases unfavorably. Therefore, it is desirable that the spring force may be set in the above-mentioned range.

Figure 21:
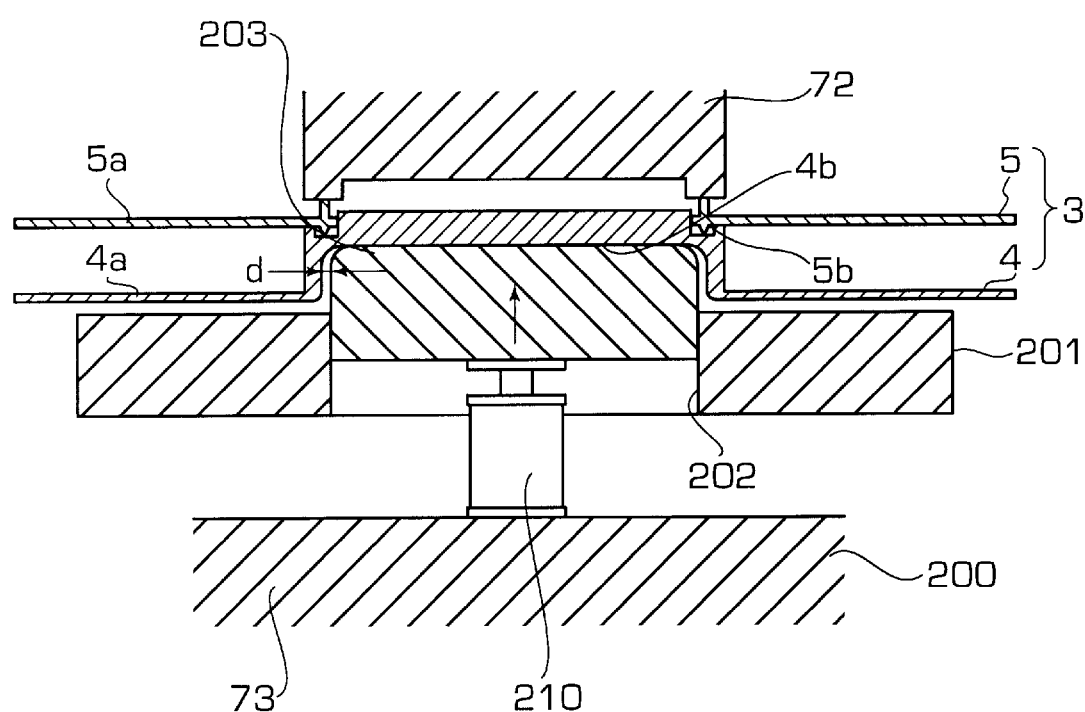
FIG. 21 is an enlarged view of the main portions of a fifth embodiment according to the invention, showing a state thereof in which a horn is pressed against upper and lower reels mounted on a receive base.

Now, FIG. 21 shows the main portions of an ultrasonic welding device according to a fifth embodiment of the invention. A receive base 200 shown in FIG. 21 is similar to that employed in the first embodiment except that, as the energizing means for energizing the boss support base 203, instead of the above-mentioned the compression coil spring 204, there is employed fluid-type energizing means 210 such as a compressive gas cylinder or the like. And, in the working wait state, the boss support base 203 is situated at the raised position due to the energizing force of the energizing means 210 and, in the working state, the boss support base 203 is lowered down by the pressure of the ultrasonic welder unit 68, so that the working can be executed in a similar manner to the above-mentioned embodiment.

As can be clearly understood from the foregoing description, in the ultrasonic welding device according to the present embodiment, if the welder unit is lowered down, then the boss support portion of the receive base holding the workpieces is lowered down together with the workpieces against the energizing force of the energizing means and, if the flange portion of the workpiece is seated on the flange support portion of the receive base, then the workpiece is worked while it is held at the seated position. This prevents the surface of the workpiece from slipping off the receive base due to the deformation and/or vibration of the boss portion of the workpiece.

Figure 22:
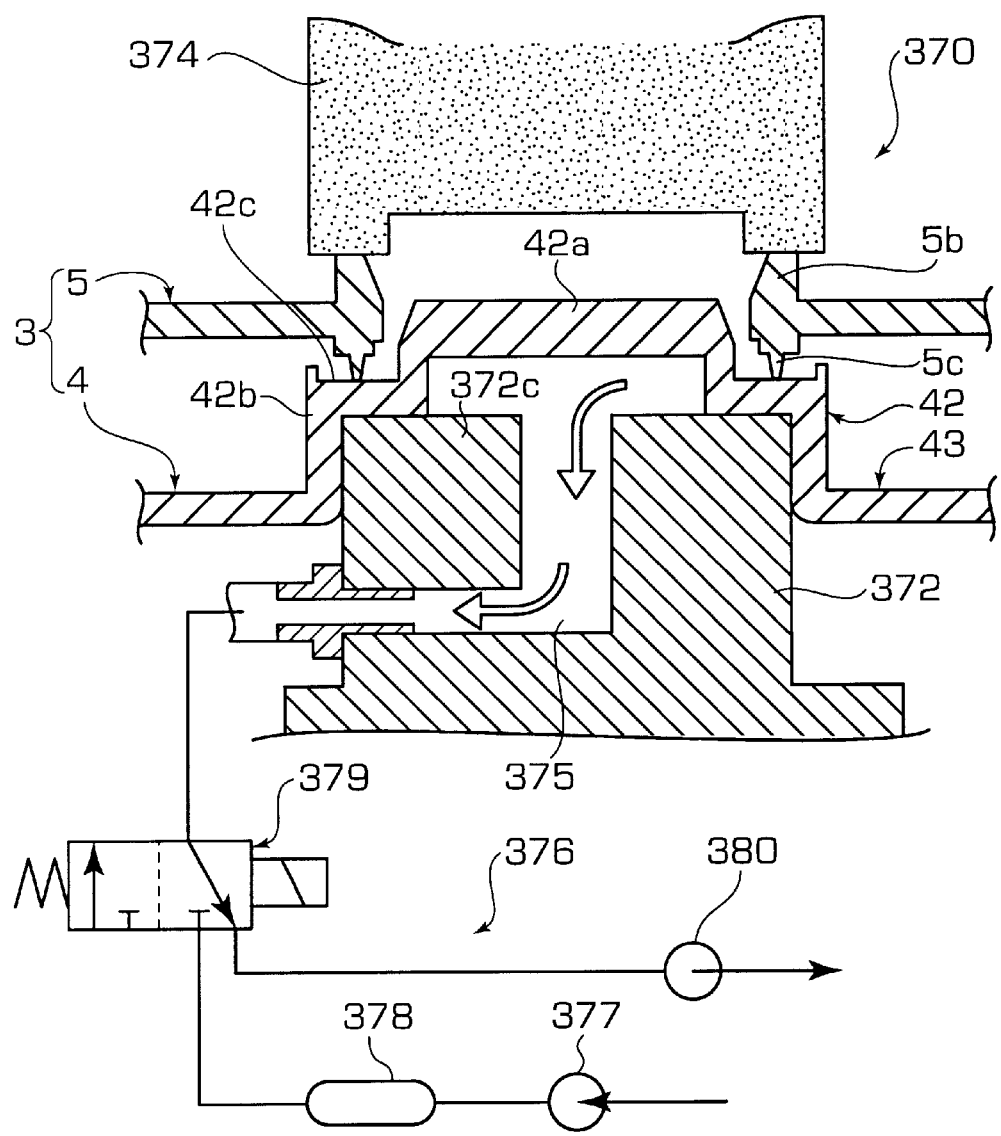
FIG. 22 is a section view of the main portions of a magnetic tape cartridge reel welding device according to a sixth embodiment of the invention.

Now, FIG. 22 is a section view of the main portions of a magnetic tape cartridge reel welding device according to a sixth embodiment of the invention.

Figure 5:
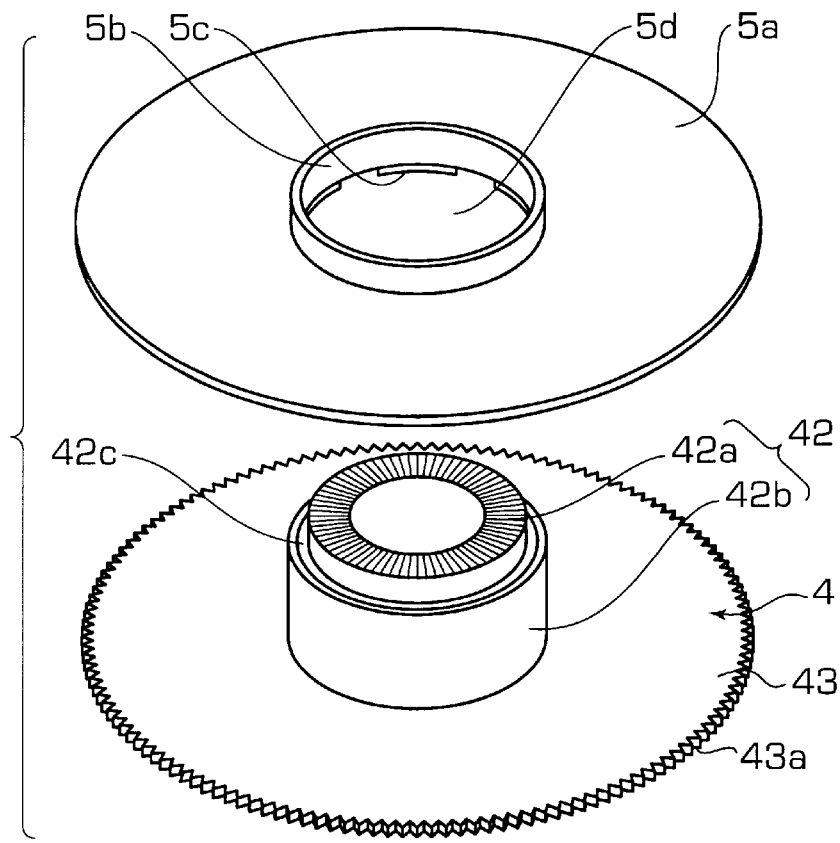
FIG. 5 is an exploded perspective view of the magnetic tape cartridge reel shown in FIG. 1.
Figure 6:
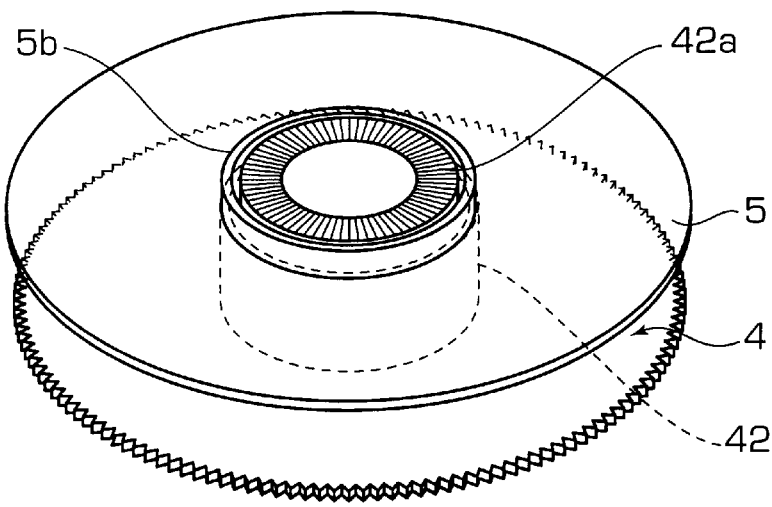
FIG. 6 is a perspective view of the magnetic tape cartridge reel shown in FIG. 5, showing its assembling state.
Figure 7:
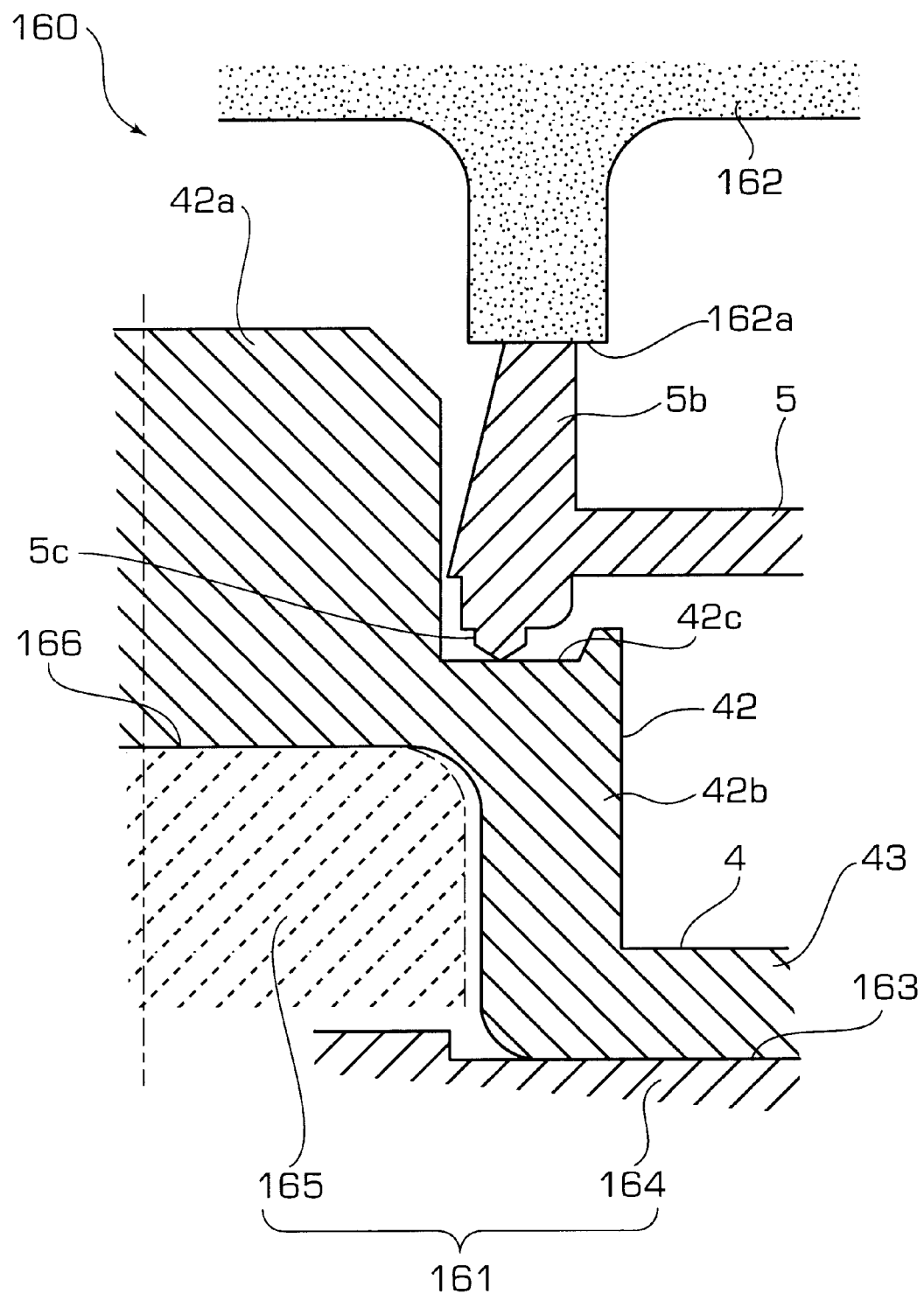
FIG. 7 is a section view of the main portions of a conventional magnetic tape cartridge reel welding device.
Figure 8:
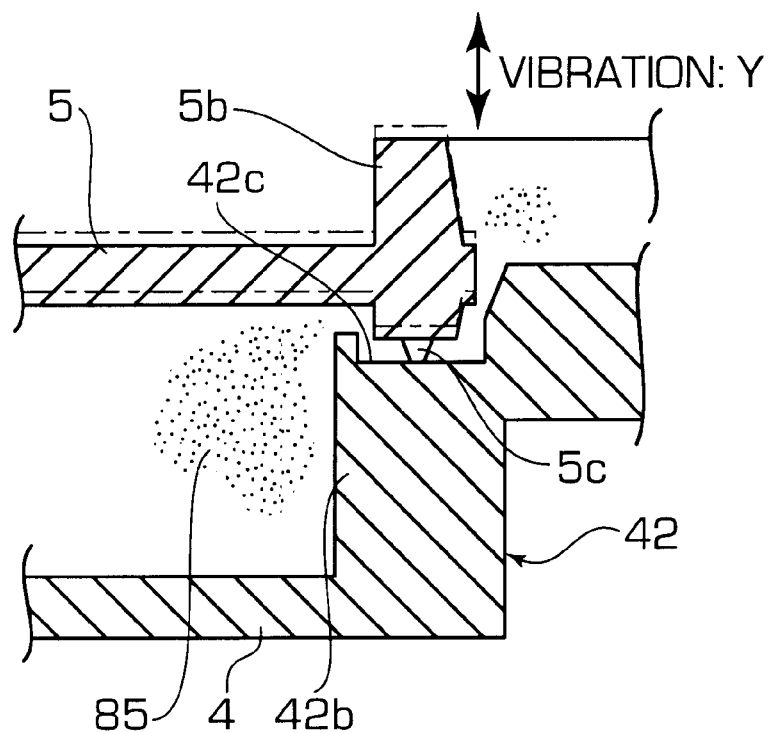
FIG. 8 is a general explanatory view of the welded state of upper and lower reels obtained when they are welded ultrasonically using the conventional magnetic tape cartridge reel welding device shown in FIG. 7.

A welding device 370 according to the present embodiment is used to weld together the upper and lower reels 4 and 5 of the reel 3 for use in a magnetic tape cartridge shown in FIGS. 1, 5 and 6 which have been previously discussed, thereby connecting them into an integral body. The structure of the reel 3 is the same as has been described before and thus the description thereof is omitted here for the purpose of simplification.

The welding device 370 comprises: a welding receive base 372 for supporting the upper reel 4 in the reversed state in which the flange portion 43 is disposed in the lower portion thereof, so that the welding receive base 372 can support the upper reel 4 from the bottom portion inner surface side of the reel hub 42 of the upper reel 4; and, a welding horn 374 which, with the lower reel 5 assembled to the bottom portion of the reel hub 42 of the upper reel 4, presses the annular rib 5b of the lower reel 5 against the upper reel 4. In operation, in the present welding device 370, by means of ultrasonic vibration energy applied from the welding horn 374 to the welding rib 5c of the lower reel 5, the lower reel 5 is welded to the upper reel 4 into an integral body to thereby produce the reel 3 for a magnetic tape cartridge.

In the present embodiment, the welding receive base 372 is of a type that the center projecting portion 372c thereof can be fitted into the bottomed recessed portion of the reel hub 42 of the upper reel 4. A fitting tolerance between the center projecting portion 372c of the welding receive base 372 and the bottomed recessed portion of the reel hub 42 is set in such a manner that they can be clearance fitted with each other with a dimensional tolerance as small as possible.

And, in the welding receive base 372, there is provided reel hub fixing means 376 which is capable of applying a draw-in force or a blow-out force to the reel hub 42 mounted on the welding receive base 372.

The reel hub fixing means 376 comprises a communication passage 375 formed in the welding receive base 372, a suction pump 380 for generating a negative pressure to thereby apply a draw-in force into the bottomed recessed portion of the reel hub 42, a compressor 377 for generating a positive pressure to thereby apply a blow-out force into the bottomed recessed portion of the reel hub 42, an air tank 378 for storing therein the pressure that is generated by the compressor 377, and an electromagnetic switch valve 379 for switching the communication passage 375 into communication with the suction pump 380 or compressor 377.

When the upper reel 4 is mounted onto the welding receive base 372 and when the upper reel 4 is excited by the welding horn 374, as shown in FIG. 22, the draw-in force is applied into the bottomed recessed portion of the reel hub 42 by the suction pump 380 to thereby draw in and fix the upper reel 4 to the welding receive base 372.

And, when the ultrasonic welding treatment is finished and thus the upper reel 4 is to be removed from the welding receive base 372, the electromagnetic switch valve 379 is switched to thereby drive the compressor 377 to apply the blow-out force into the bottomed recessed portion of the reel hub 42 of the upper reel 4, so that the upper reel 4 can be removed from the welding receive base 372.

In the above-mentioned welding device 370, not only because the welding receive base 372 for supporting the upper reel 4 is of a type that it can be fitted with the bottomed recessed portion of the reel hub 42, but also because the reel hub 42 of the upper reel 4 and the center projecting portion 372c of the welding receive base 372 are clearance fitted with each other with a small dimensional tolerance, the positional slippage and relative rotation of the upper reel 4 when excited can be prevented.

Further, when the upper reel 4 is set or mounted onto the center projecting portion 372c of the welding receive base 372, since the reel hub fixing means 376 applies the draw-in force into the bottomed recessed portion of the reel hub 42 of the upper reel 4, there is generated a negative pressure in the bottomed recessed portion of the reel hub 42. Due to this, in spite of the small dimensional tolerance, the upper reel 4 can be set onto the welding receive base 372 quickly.

On the other hand, when removing the upper reel 4 from the center projecting portion 372c of the welding receive base 372, since the reel hub fixing means 376 applies the blow-out force into the bottomed recessed portion of the reel hub 42 of the upper reel 4, in the removing operation, the pressure in the bottomed recessed portion of the reel hub 42 is turned into a negative pressure to thereby be able to prevent the production of a removing resistance, which makes it possible to remove the upper reel 4 more quickly.

That is, since the mounting and removal of the upper reel 4 onto and from the welding receive base 372 can be carried out simply and quickly and the reel 3 can be thereby delivered by a belt conveyor, the productivity of the reel 3 can be enhanced.

In addition, in the ultrasonic excitation, since the upper reel 4 is positively held and fixed to the welding receive base 372 by means of the negative pressure draw-in force applied by the reel hub fixing means 376, there is eliminated the possibility that the upper reel 4 can be made to slip off in position in the radial direction thereof with respect to the welding receive base 372 due to the vibrations transmitted from the welding horn 374 or to rotate with respect to the lower reel 5. This in turn avoids a fear that uneven welding can be produced in the ultrasonic welding to thereby lower the welding accuracy and cause the surface slippage of the lower reel 5, thereby being able to obtain a high-accuracy reel for use in a magnetic tape cartridge.

By the way, the concrete structure of the reel hub fixing means 376 capable of applying the draw-in or blow-out force to the reel hub 42 mounted on the welding receive base 372 is not limited to the above-mentioned embodiment, but, of course, other various structures can be employed.

With use of a magnetic tape cartridge reel welding device according to the present embodiment of the invention, when setting or mounting the upper reel onto the welding receive base, since the reel hub fixing means applies the draw-in force to the upper reel, the upper reel can be mounted more quickly.

Also, in the ultrasonic welding operation, since the reel hub fixing means applies the draw-in force to the upper reel, the upper reel can be positively held on and fixed to the welding receive base, thereby being able to prevent the upper reel from slipping off in position in the radial direction thereof with respect to the welding receive base or from rotating with respect to the lower reel due to the vibrations transmitted thereto from the welding horn.

Further, when removing the upper reel from the welding receive base, since the reel hub fixing means applies the blow-out force to the upper reel, the upper reel can be removed more quickly.

Therefore, according to the present embodiment, it is possible to provide a magnetic tape cartridge reel welding device which not only can carry out the mounting and removal of the upper reel onto and from the welding receive base simply and quickly to thereby enhance the productivity of the reel, but also, in the ultrasonic welding operation, can prevent the upper reel from slipping off in position with respect to the welding receive base or from rotating with respect to the lower reel to cause uneven welding between the upper and lower reels, thereby being able to obtain a high-accuracy reel for use in a magnetic tape cartridge.

Figure 23:
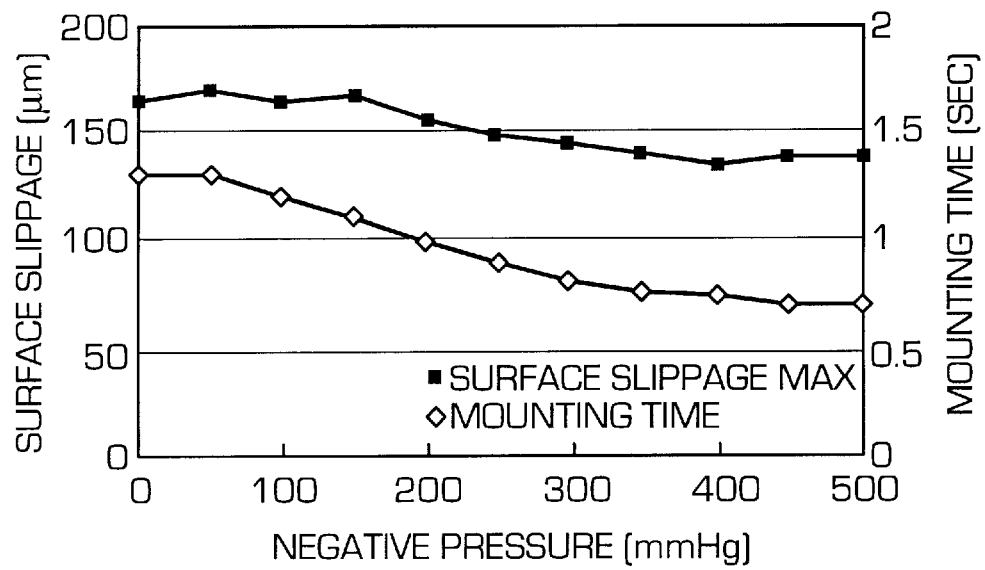
FIG. 23 is a graphical representation of the relation between the negative pressures of a reel hub fixing means and the surface slippage and mounting time of an upper reel in the sixth embodiment of the invention.
Figure 24:
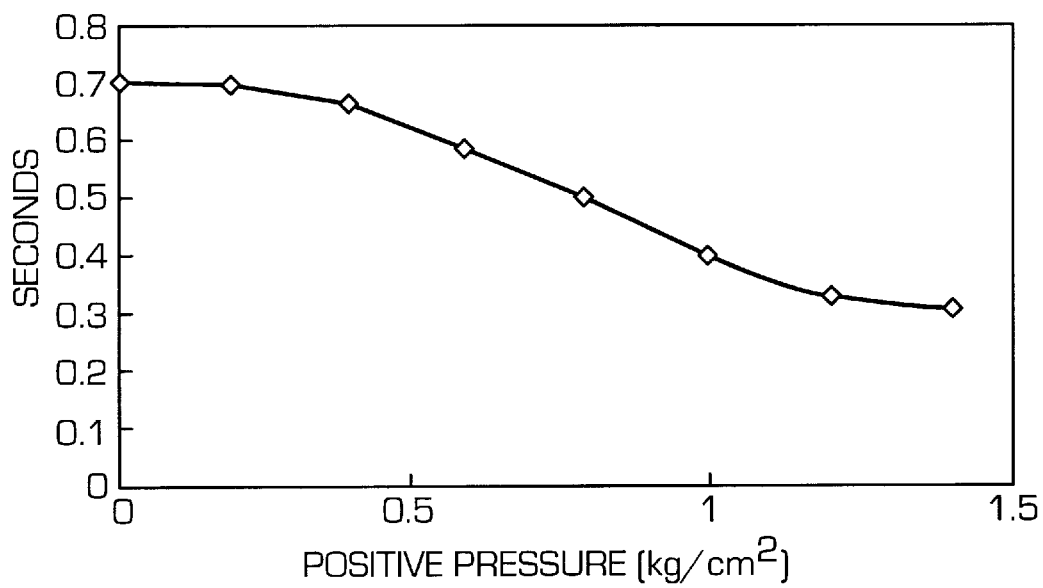
FIG. 24 is a graphical representation of the relation between the positive pressures of the reel hub fixing means and the mounting and removing time of the upper reel in the sixth embodiment of the invention.

Now, in order to make clear the effects of the present invention, while changing the negative or positive pressure to be given by the reel hub fixing means 376, there have been conducted tests on the relation of the negative pressure with respect to the surface slippage of the upper reel 4 and the mounting time of the upper reel 4 onto the welding receive base 372, or the relation between the positive pressure and the removing time of the upper reel 4, and the test results are shown in FIGS. 23 and 24.

As can be seen clearly from FIG. 23, for the surface slippage of the upper reel, when the negative pressure exceeds approx. 150 mmHg, then the slippage and rotation of the upper reel are reduced, that is, there can be obtained a surface slippage restriction effect. However, even when the negative pressure is increased up to 100 mmHg or higher, the holding and fixing state of the upper reel will not be changed and, therefore, the surface slippage restrictive effect cannot be enhanced either. Also, an effect on the mounting time of the upper reel onto the welding receive base 372 starts to appear at and from the time when the negative pressure is higher than 100 mmHg. However, when the negative pressure is higher than 450 mmHg, the influence of the mechanical operation time of the welding receive base 372 becomes large, so that the surface slippage restrictive effect reaches saturation.

Also, as can be seen clearly from FIG. 24, an effect on the removing time of the upper reel starts to appear at and from a positive pressure of the order of 0.3 kg/cm$^2$, and, when the positive pressure exceeds 1 kg/cm$^2$, then the removing time is restricted by the moving time of the welding receive base 372, so that the removing time reducing effect reaches saturation.

By the way, in the above tests, the mean value of the dimensional difference between the outside diameter of the center projecting portion 372c of the welding receive base 372 and the inside diameter of the reel hub 42 of the upper reel 4 was set as 0.06 mm, the vertical stroke of the welding receive base 372 was set as 30 mm, and the gap between the upper reel 4 and welding horn 374 when the welding receive base 372 is set was set as 5 mm, respectively. Also, the mounting and removing forces of the reel hub 42 with respect to the welding receive base 372 were respectively set as 10 N, while the pressure in the ultrasonic welding operation was set as 50 N.

Now, description will be given below in detail of magnetic tape cartridge tape welding method and device according to a seventh embodiment of the invention with reference to the accompanying drawings.

Figure 25:
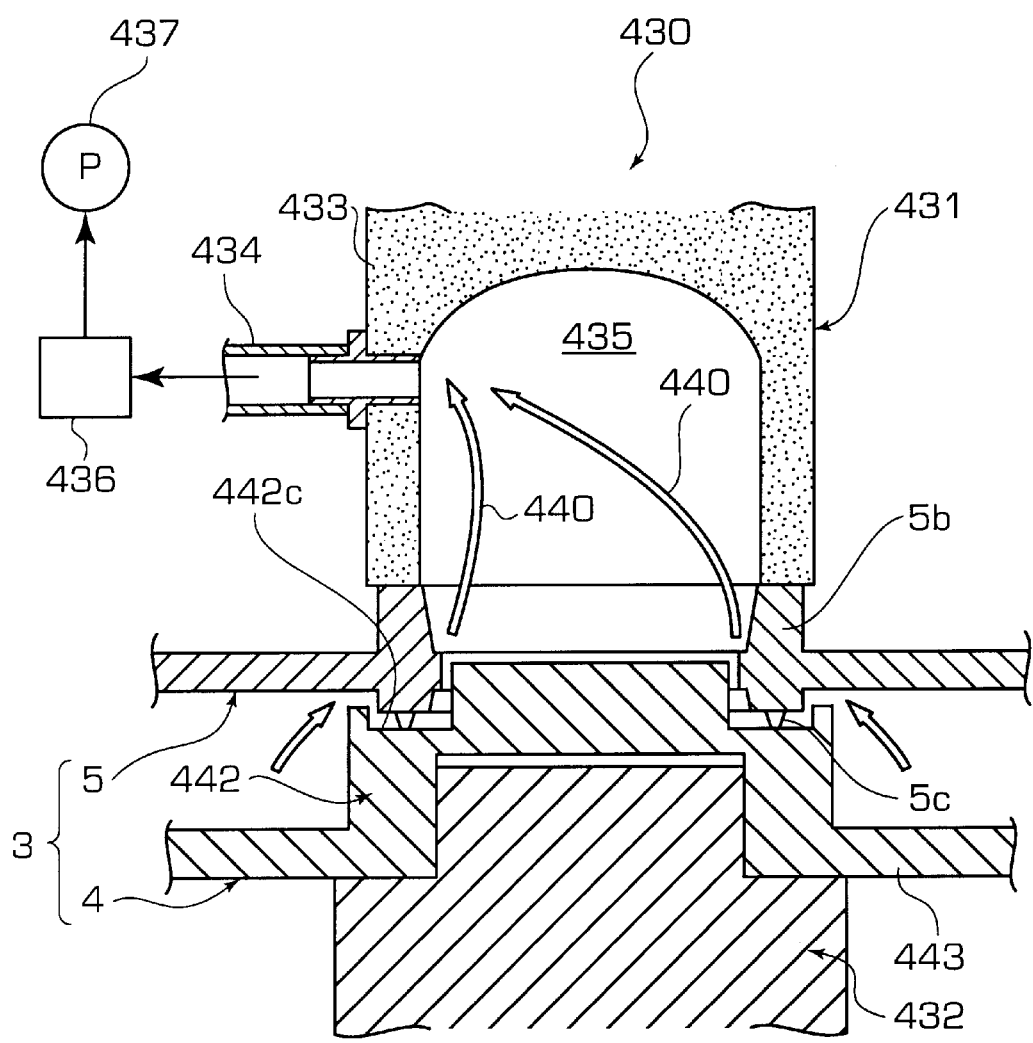
FIG. 25 is a section view of the main portions of a magnetic tape cartridge reel welding device according to a seventh embodiment of the invention.

FIG. 25 is a section view of the main portions of a magnetic tape cartridge tape welding device according to the seventh embodiment of the invention.

A welding device 430 according to the present embodiment is used to weld together the upper and lower reels 4 and 5 of the reel 3 for use in a magnetic tape cartridge shown in FIGS. 5 and 6 which have been previously discussed, thereby connecting them into an integral body. The structure of the reel 3 is the same as has been described before and thus the description thereof is omitted here for the purpose of simplification.

The welding device 430 comprises: a welding receive base 432 for supporting the upper reel 4 in the reversed state in which the flange portion 443 is disposed in the lower portion thereof, so that the welding receive base 432 can support the upper reel 4 from the bottom portion inner surface side of the reel hub 442; and, a welding horn 431 which, with the lower reel 5 assembled to the bottom portion of the reel hub 442 of the upper reel 4, presses the annular rib 5b of the lower reel 5 against the upper reel 4. In operation, in the present welding device 430, by means of ultrasonic vibration energy applied from the welding horn 431 to the welding rib 5c of the lower reel 5, the lower reel 5 is welded to the upper reel 4 into an integral body to thereby produce the reel 3 for use in a magnetic tape cartridge.

In the present embodiment, as shown in FIG. 25, on the horn leading end face of the welding horn 431 that is opposed to the bottom portion of the reel hub 442, there is formed a recessed portion 435 inside the outer periphery edge portion of the welding horn 431 that can be contacted with the annular rib 5b of the lower reel 5, while the recessed portion 435 is in communication with the horn side face through a suction hole 433. Also, a suction pipe 434 in communication with a vacuum pump 437 is connected to the suction hole 433. That is, these elements cooperate together in forming suction means which is capable of applying a negative pressure to the inner peripheral portion of an opening formed in the lower reel 5. By the way, in the middle portion of the suction pipe 434, there is disposed a dust collecting device 436 which is used to collect resin powder and the like contained in the air sucked.

Figure 26:
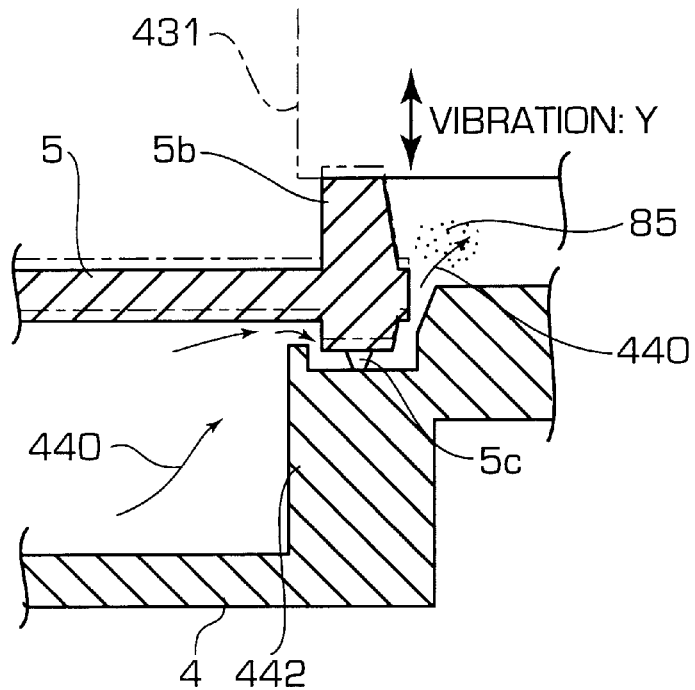
FIG. 26 is a general explanatory view of the welded state of upper and lower reels obtained when they are welded together ultrasonically using the welding device shown in FIG. 25.
Figure 27:
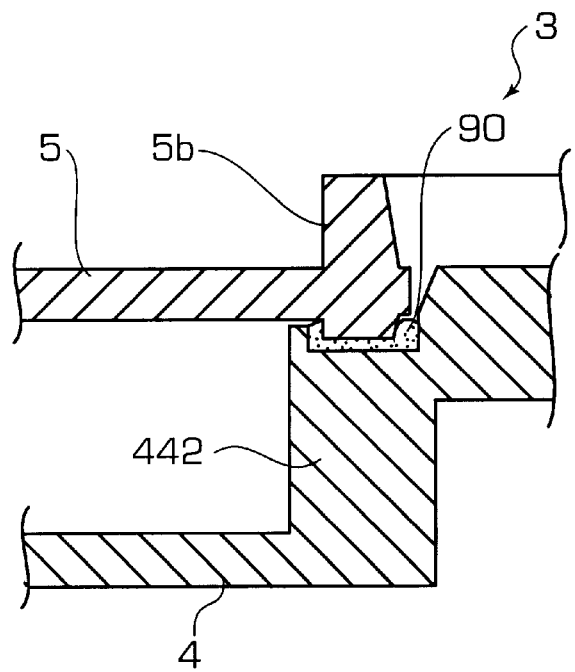
FIG. 27 is also a general explanatory view of the welded state of the upper and lower reels obtained when they are welded together ultrasonically using the welding device shown in FIG. 25; and, FIG. 28 is a graphical representation of the relation between the negative pressures and the overflow rate of welded portions in an embodiment-enforced by a welding method according to a seventh embodiment of the invention.

Next, description will be given below of a reel welding method using the thus structured welding device 430 with reference to FIGS. 25, 26 and 27.

When welding together the upper and lower reels 4 and 5 using the welding device 430, at first, the bottomed recessed portion of the reel hub 442 of the upper reel 4 is fitted with the center projecting portion of the welding receive base 432 to thereby set the upper reel 4 in a reversed state thereof with the flange portion 443 of the upper reel 4 facing downward. And, with the lower reel 5 assembled to the bottom portion of the reel hub 442 of the upper reel 4, the welding horn 431 opposed to the welding receive base 432 is lowered down to thereby press the annular rib 5b of the lower reel 5 against the upper reel 4 (this state is shown in FIG. 25). From the viewpoint of a welding cycle (that is, productivity), preferably, the air may have been sucked from the suction hole 433 prior to the lowering motion of the welding horn 431.

By the way, the air suction from the suction hole 433 may also be started just before the ultrasonic vibration is applied.

If the ultrasonic vibration is applied by the welding horn 431, then there is generated friction (friction due to the ultrasonic vibrations Y) between the mutually contacted portions of the welding rib 5c and welding contact portion 42c. Due to this friction, there is generated heat and the welding rib 5c is melted by the thus generated heat. However, before the welding rib 5c starts to melt, there is produced shaved powder 85 due to the friction (that is, there is generated dust).

In this ultrasonic welding operation, since the interior portion of the recessed portion 435 of the welding horn 431 is turned into a negative pressure by the vacuum pump 437, the air existing between the upper and lower reels 4 and 5 is sucked into the inner peripheral portion of the opening of the lower reel 5 through gaps formed between a plurality of welding ribs 5c which are provided at regular intervals and are respectively formed almost in an annular shape, or through the mutually contacted portions of the welding rib 5c and welding contact portion 442c. This air suction causes a suction flow 440, while the shaved powder 85 caused by the friction is thereby sucked into the suction hole 433 and, after then, the shaved powder 85 is removed from between the upper and lower reels 4 and 5.

Figure 9:
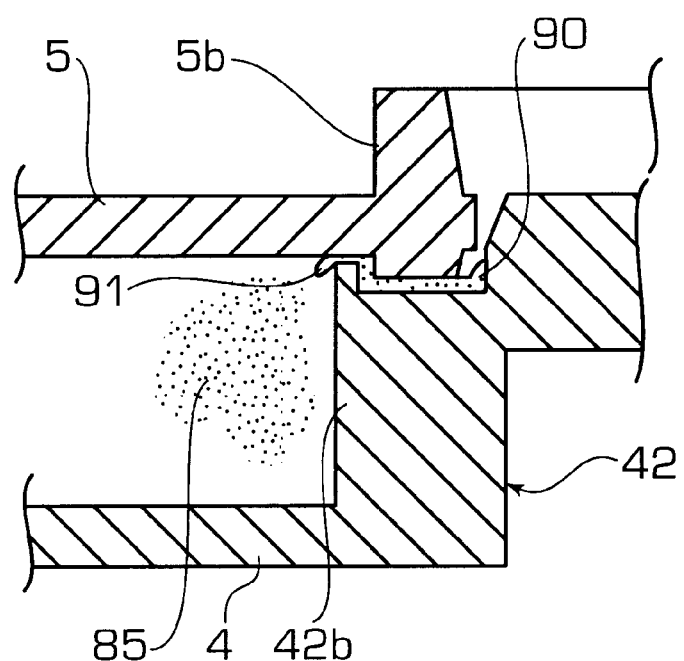
FIG. 9 is also a general explanatory view of the welded state of upper and lower reels obtained when they are welded ultrasonically using the conventional magnetic tape cartridge reel welding device shown in FIG. 7.

And, also when the welding rib 5c starts to melt, the air suction from the suction hole 433 is executed and, since the interior portion of the recessed portion 435 is still held in the negative pressure, the melted welding rib 5c is pulled toward the inner peripheral portion of the opening of the lower reel 5. As a result of this, it is possible to prevent such lump 491 of the melted resin 90 as shown in FIG. 9 from overflowing into the tape winding area of the welded portion. Further, the suction flow 440 produces a cooling effect to thereby allow the welded portion to harden well, which also makes it possible to restrict the overflow of the melted resin 90 effectively.

By the way, the suction means used in a welding device according to the present invention is not limited to the structure of the above-mentioned embodiment, but other various structures can also be employed. Also, the shapes of the welding horn and other parts are not limited to those shown in the above-mentioned embodiment, but they can be changed properly.

As has been described above, with use of the magnetic tape cartridge reel welding method and device according to the invention, when welding together the upper and lower reels, the shaved powder produced before the welding contact portion of the welding rib starts to melt can be sucked and removed by the suction means through the inner peripheral portion of the opening of the lower reel. This can prevent the shaved powder remaining between the upper and lower reels from attaching to the magnetic tape to thereby incur the missing signals in the recording and reproducing operations.

And, also when the welding rib starts to melt, the melted welding rib is pulled toward the inner peripheral portion of the opening of the lower reel, which makes it possible to prevent the lump of the melted resin from overflowing into the tape winding area of the welded portion. Further, the suction flow generated in the welding operation produces a cooling effect, so that the melted resin can be hardened well to thereby prevent the overflow of the melted resin into the tape winding area of welded portion effectively.

Therefore, according to the present invention, there can be provided magnetic tape cartridge reel welding method and device which not only can remove effectively the shaved powder of the resin produced when the upper and lower reels are connected together by ultrasonic welding, but also can prevent the melted resin of the upper and lower reels from overflowing into the tape winding area of the welded portion.

Figure 28:
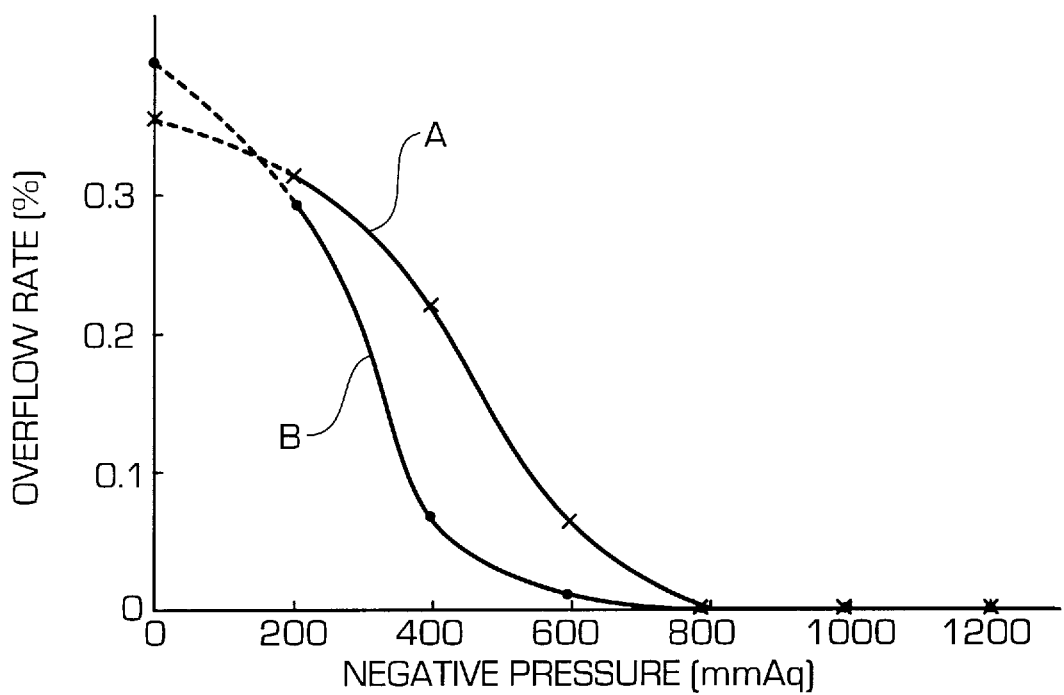

In order to make clear the effects of the present invention, after the upper and lower reels 4 and 5 were connected together by ultrasonic welding under the following conditions while changing properly the negative pressure set by the suction means according to the present invention, tests have been conducted on the relation between the negative pressure and the overflow rate and the test results are shown in FIG. 28.

Here, the overflow rate means the rate of occurrence of defective products due to overflow (that is, the number of defective products/the number of worked products).
(Conditions of reel)
Material of lower reel: polycarbonate
Material of upper reel: polycarbonate (containing 15% of glass fibers)
Projecting height of welding rib: 0.4 mm
Diameter of welding rib arranged in an annular shape: 3.9 mm
Welding rib length/annularly arranged welding rib circumference×100 (%):
Test sample A=80 (%);
Test sample B=95 (%)
(Conditions of welding device and other conditions)

Frequency of welding horn: 20 kHz (c/s)
Pressure of welding horn: 10 kgf
Amplitude of welding horn: 50 μmP-P
Negative pressure by suction means: 200 mmAq, 400 mmAq, 600 mmAq, 800 mmAq, 1000 mmAq, 1200 mmAq
Effective section area of piping system: 20 mm$^2$
(By the way, since large piping resistance raises a problem, preferably, the effective section area of the piping system may be 10 mm$^2$ or more, more preferably, 20 mm$^2$ or more.

As can be seen clearly from FIG. 28, as the negative pressure given by the suction means increases, the overflow rate decreases, thereby being able to obtain a good reel which is free from the overflow of the melted resin into the tape winding area of the welded portion. However, if the negative pressure is too high, then the cooling effect is too great, which increases the welding time. Therefore, it is not desirable to apply an excessively high negative pressure.

Also, although the shaved powder of the resin in the welding operation was observed by visually viewing the reel after welded, almost no effect could be confirmed.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A welding control method for use in an ultrasonic welding operation in which a horn is contacted with workpieces and pressure is applied to said workpieces from said horn to thereby melt and weld together said workpieces, and in which a displacement sensor measures a downward displacement caused by a change in a melting thickness of said workpieces, said welding control method comprising:

switching an amplitude of an ultrasonic energy emitted from said horn from a first level to a second level which is smaller than said first level but greater than zero, wherein said switching is based on an output of said displacement sensor measuring said melting thickness of said workpieces.

2. The welding control method for use in an ultrasonic welding operation according to claim 1, in which said switching step is executed before a melting thickness reaches one half of a final predetermined melting thickness.

3. The welding control method for use in an ultrasonic welding operation according to claim 1, in which said switching step is executed in a range of 20 to 40% of a final predetermined melting thickness.

4. The welding control method for use in an ultrasonic welding operation according to claim 1, further comprising:

outputting a measurement signal from said displacement sensor, wherein said measurement signal is proportional to a displacement of a welder main body caused by melting and welding said workpieces together, and wherein said displacement sensor is a linear encoder.

5. A welding control method for use in an ultrasonic welding operation in which a horn is contacted with workpieces and pressure is applied to said workpieces from said horn to thereby melt and weld together said workpieces, and in which a displacement sensor measures a downward displacement caused by a change in a melting thickness of said workpieces, said welding control method comprising:

switching the pressure from a first level to a second level which is smaller than said first level, wherein said switching is based on an output of said displacement sensor measuring said melting thickness of said workpieces.

6. The welding control method for use in an ultrasonic welding operation according to claim 5, in which said switching step is executed before a melting thickness reaches one half of a final predetermined melting thickness.

7. The welding control method for use in an ultrasonic welding operation according to claim 5, in which said switching step is executed in a range of 20 to 40% of a final predetermined melting thickness.

8. The welding control method for use in an ultrasonic welding operation according to claim 5, further comprising:

outputting a measurement signal from said displacement sensor, wherein said measurement signal is proportional to a displacement of a welder main body caused by melting and welding said workpieces together, and wherein said displacement sensor is a linear encoder.

* * * * *